(12) United States Patent
Smith

(10) Patent No.: US 11,102,525 B2
(45) Date of Patent: Aug. 24, 2021

(54) INJECTING CUSTOMIZED CONTENT INTO 360-DEGREE VIDEOS

(71) Applicant: Adobe Inc., San Jose, CA (US)

(72) Inventor: Kevin Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/746,580

(22) Filed: Jan. 17, 2020

(65) Prior Publication Data

US 2020/0154157 A1 May 14, 2020

Related U.S. Application Data

(63) Continuation of application No. 15/696,087, filed on Sep. 5, 2017, now Pat. No. 10,575,033.

(51) Int. Cl.
| | |
|---|---|
| *H04N 7/10* | (2006.01) |
| *H04N 7/025* | (2006.01) |
| *H04N 21/234* | (2011.01) |
| *H04N 21/81* | (2011.01) |
| *H04N 21/858* | (2011.01) |
| *H04N 21/258* | (2011.01) |

(52) U.S. Cl.
CPC . *H04N 21/23424* (2013.01); *H04N 21/23418* (2013.01); *H04N 21/25883* (2013.01); *H04N 21/25891* (2013.01); *H04N 21/812* (2013.01); *H04N 21/858* (2013.01); *H04N 21/8586* (2013.01)

(58) Field of Classification Search
CPC ....... H04N 21/23424; H04N 21/23418; H04N 21/25891; H04N 21/812; H04N 21/858
See application file for complete search history.

(56) References Cited

U.S. PATENT DOCUMENTS

| 10,575,033 B2 | 2/2020 | Smith | |
|---|---|---|---|
| 2008/0008439 A1* | 1/2008 | Liu | H04N 21/458 386/248 |
| 2008/0050026 A1* | 2/2008 | Bashyam | H04N 19/124 382/238 |
| 2009/0119169 A1* | 5/2009 | Chandratillake | G06F 16/78 705/14.46 |

(Continued)

OTHER PUBLICATIONS

U.S. Appl. No. 15/696,087, May 3, 2018, Preinterview 1st Office Action.

(Continued)

*Primary Examiner* — Kyu Chae

(74) *Attorney, Agent, or Firm* — Keller Jolley Preece

(57) ABSTRACT

Methods and systems for inserting targeted advertisements into video content. One or more embodiments analyze video content to identify media insertion locations on digital object surfaces for inserting advertisements. Additionally, one or more embodiments select advertisements to insert into the video content at the media insertion locations based on the media insertion locations, a viewer, or a viewing device of the viewer. One or more embodiments also digitally insert the advertisements into the video content by placing the selected advertisements at the media insertion locations corresponding to the digital object surfaces. One or more embodiments then provide the video content with the targeted advertisements to the viewing device of the viewer.

20 Claims, 14 Drawing Sheets

(56) References Cited

U.S. PATENT DOCUMENTS

| | | | |
|---|---|---|---|
| 2012/0022954 A1* | 1/2012 | Garcia | G06F 16/9577 |
| | | | 705/14.73 |
| 2013/0031582 A1 | 1/2013 | Tinsman et al. | |
| 2015/0134466 A1* | 5/2015 | Hayward | H04N 21/4782 |
| | | | 705/14.73 |
| 2016/0117722 A1* | 4/2016 | Garcia | G06Q 50/10 |
| | | | 705/14.49 |
| 2017/0076498 A1 | 3/2017 | Dakss et al. | |
| 2017/0173472 A1 | 6/2017 | Hardy et al. | |
| 2017/0178409 A1* | 6/2017 | Bloch | G11B 27/00 |
| 2017/0195748 A1* | 7/2017 | Shkedi | H04N 21/4532 |
| 2017/0278289 A1* | 9/2017 | Marino | G06Q 30/0276 |
| 2017/0286993 A1* | 10/2017 | Khalid | G06T 19/006 |
| 2018/0003979 A1* | 1/2018 | Nakashima | G02B 27/017 |

OTHER PUBLICATIONS

U.S. Appl. No. 15/696,087, Sep. 7, 2018, Office Action.
U.S. Appl. No. 15/696,087, Jul. 10, 2019, Office Action.
U.S. Appl. No. 15/696,087, Oct. 18, 2019, Notice of Allowance.

* cited by examiner

INJECTING CUSTOMIZED CONTENT INTO 360-DEGREE VIDEOS

CROSS-REFERENCE TO RELATED APPLICATIONS

The present application is a continuation of U.S. application Ser. No. 15/696,087, filed on Sep. 5, 2017. The aforementioned application is hereby incorporated by reference in its entirety.

BACKGROUND

The availability and consumption of digital video content continues to increase as the prevalence of smartphones and other devices capable of displaying digital video increases. With the increased consumption of digital video content comes more opportunities for advertisers to promote their brands or products. Specifically, users can use their devices to download and/or stream movies, television shows, user-generated videos, or other types of digital video content. By leveraging the many different types of video content available, advertisers or other entities can promote brand awareness to large numbers of people.

Many advertisements, however, are disruptive and interrupt the experience of the user. For example, conventional advertising systems that provide targeted advertising to viewers of a digital video typically interrupt the video to provide a commercial, popup advertisement, or overlay on top of a digital video player that includes content related to the viewers' interests. Interrupting a video to provide an advertisement, not only interrupts the video but also effectively lengthens the time required to view the video. Because conventional advertising systems interrupt the viewing experience, viewers can have a negative reaction to the advertisements, particularly as viewers become more accustomed to watching digital video without advertising breaks (e.g., due to digital video recording capabilities and digital video subscriptions).

To provide advertisements without interrupting the experience of the user, many advertisers use product placement or background advertising in videos. For example, instead of stopping a video to display an advertisement, some video advertising methods use product placement to insert products into a video in a way that highlights the product to the user. Examples of the foregoing include having an actor drive a particular brand of car, having an actor wear particular articles of clothing, placing objects within scenes to be included in the video, etc.

One will appreciate that this type of product placement/advertising requires that the products/advertisements are included within a scene to be captured in the video prior to the filming of the video. Accordingly, the advertisements are the same for everyone viewing the digital video. Furthermore, the advertisements or products placed cannot be changed after the video is produced. Thus, such advertisements are often out of date or not relevant to the audience or viewer of the video. Moreover, such advertising is static with no immediate conversion possible. These and other disadvantages may exist with respect to conventional advertising techniques in connection with digital videos.

BRIEF SUMMARY

Embodiments of the present disclosure provide benefits and/or solve one or more of the foregoing or other problems in the art with systems, computer-readable media, and methods that digitally augment scenes within previously generated video content with digital visual media (e.g., targeted advertisements). In one or more embodiments, the systems, computer-readable media, and methods analyze video content to determine one or more locations on digital objects within the video for inserting advertisement media (e.g., static and/or video media) into the video content. The systems, computer-readable media, and methods select advertisements to insert into the video content based on characteristics of the locations, viewers of the video content, or viewing devices that the viewers use to view the video content. The systems, computer-readable media, and methods then augment the video content by digitally insert the advertisements into the video content at the previously identified locations within the video content. Accordingly, the systems and methods can provide video content to viewers with targeted advertisements that have been digitally inserted into the video content.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail using the accompanying drawings in which.

DETAILED DESCRIPTION

Figure 1:
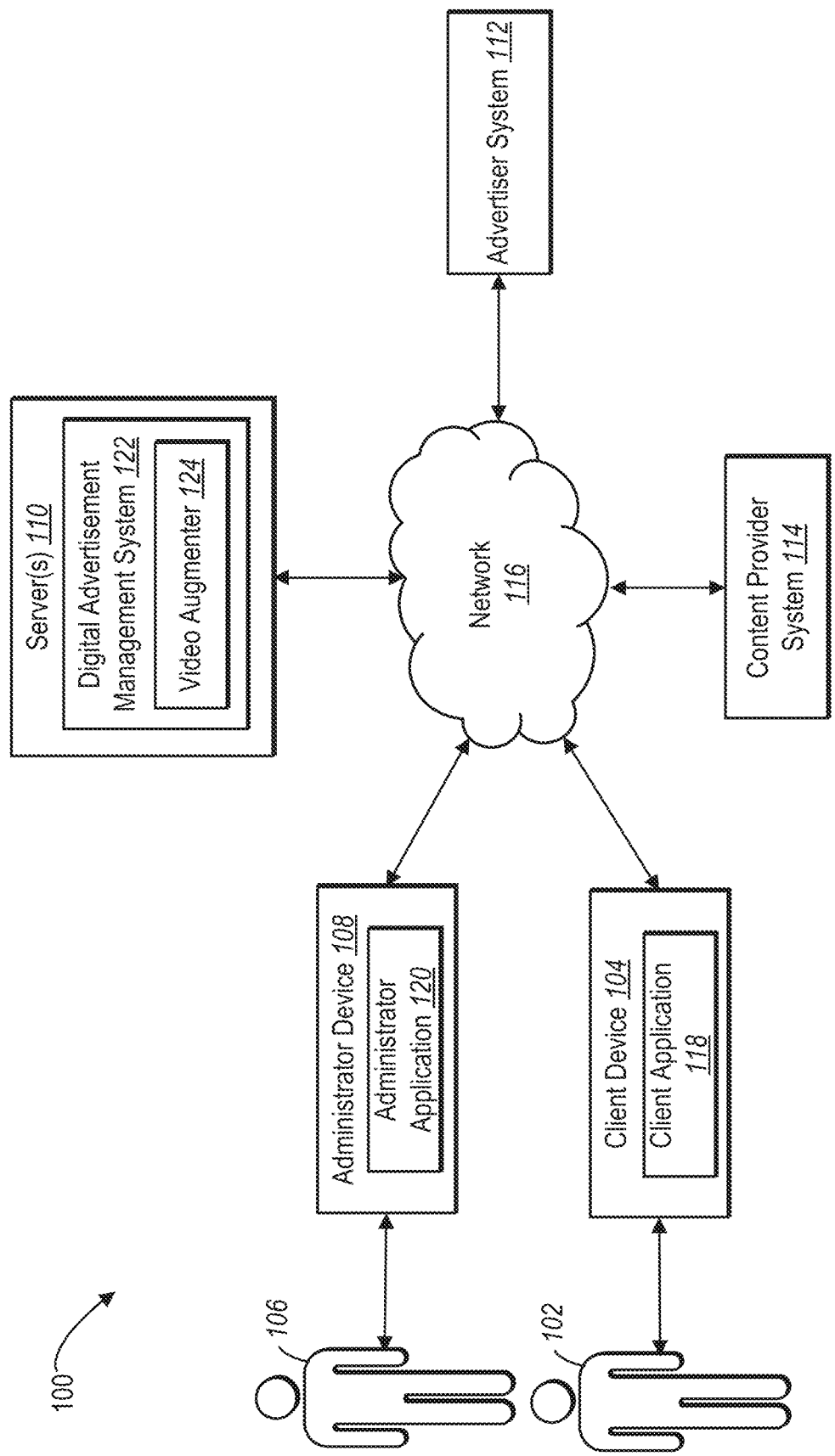
FIG. 1 illustrates an example computing environment within which a digital advertisement management system with a video augmenter can operate in accordance with one or more embodiments.

One or more embodiments of the present disclosure provide a digital advertisement management system including a video augmenter that digitally augments scenes within previously generated video content with digital visual media, such as targeted advertisements. More specifically, the video augmenter analyzes video content to find locations within the video content for inserting targeted advertisements. The video augmenter selects advertisements based on a viewer, the viewer's device, and/or the locations for inserting the advertisements into the media content at the locations. The video augmenter then digitally inserts the selected advertisements into the video content at the identified locations. The digital advertisement management system then provides the video content with the advertisements to the viewer. Thus, as the viewer watches the video content, the video content will seamlessly display the targeted advertisements as though the advertisements were originally part of the video content.

For example, when a viewer requests to view video content from a content provider on a client device, one or more embodiments analyze the video content to determine media insertion locations within the video content suitable for inserting a targeted advertisement. Specifically, the locations can be manually indicated locations or automatically identified locations that include sufficient surface space on a digital object within the video content. For instance, an advertiser or a content provider can manually select locations within the video content. Alternatively, the digital advertisement management system can use image processing techniques to recognize shapes and surfaces within the video content that include dimensions capable of displaying a targeted video or image advertisement.

After identifying media insertion locations in the video content, the digital advertisement management system selects advertisements that correspond to the media insertion locations for the viewer. In particular, for a given media insertion location, the digital advertisement management system determines characteristics of the location, the viewer, and/or the viewer's device to select an advertisement to insert into the video content. For example, the digital advertisement management system uses a viewer profile or a viewer device identifier to determine an advertisement in which the viewer may be interested. Additionally, the digital advertisement management system selects an advertisement that fits, or can be adapted to fit, within dimensions of the corresponding location within the video content.

The video augmenter then inserts selected advertisement into the corresponding media insertion location within the video content. The video augmenter can use a variety of techniques to insert the advertisement into a location on an object/surface within the video content. For example, the video augmenter can insert interactive static advertisements and/or video advertisements into the video content by placing the static/video advertisements at a set of coordinates corresponding to a media insertion location in each frame of the video content. Accordingly, even if the position of the objects corresponding to the media insertion locations change with respect to a field of view of the viewer, the advertisements will move with the objects to which they are pinned.

The video augmenter can determine the set of coordinates corresponding to a media insertion location by analyzing the video content using motion tracking techniques. For example, the video augmenter can identify a set of coordinates within the video content corresponding to edges or corners of the object (e.g., automatically or in response to a user input). The video augmenter can then use motion tracking processes to determine a path of the object surface across a plurality of frames of the video content. The video augmenter can then determine the coordinates of the edges or corners of the object in each of the plurality of frames using the determined path and then insert the advertisement at the determined coordinates in each corresponding frame.

As described herein, the video augmenter provides advantages over conventional advertising systems. Specifically, the video augmenter improves technological processes related to advertising within digital video content by seamlessly augmenting previously generated video content with advertisements. Thus, video content augmented by the video augmenter can include timely and targeted advertisements even in older video content. Thus, the video augmenter provides greater flexibility in serving digital advertisements in connection with video content than conventional systems.

Furthermore, augmenting the digital video content itself, the video augmenter can provide advertisements in connection with video content without effectively increasing a time required to watch the video content. The video augmenter seamlessly inserts advertisements onto surfaces of objects within the digital video content itself; and thus, provides augmented video content augmented with advertisements without disrupting the video content. Whereas conventional advertising disrupts the viewer experience by providing advertisements with video content by inserting advertisements at ad breaks or as overlays on top of the video content.

Additionally, the video augmenter improves the technological process related to advertising with video content by enabling interactive advertisements within previously generated video content. In particular, the video augmenter leverages location information associated with objects in the video content to insert interactive elements including advertisements that track or move with the objects. For example, the advertisement can comprise scripts that cause a webpage, application store, or other information to open when the viewer select (e.g., clicks on or taps on) the advertisement within the video content. This can allow the user to navigate directly to a forum in which they can convert. Thus, the video augmenter can improve the performance of a viewer's device to allow the viewer to interact with the advertisements within video content in ways that conventional advertising systems are unable to achieve.

Furthermore, the video augmenter can allow more accurate reporting of advertisement statistics across a plurality of client devices and mediums. Specifically, by placing targeted advertisements within video content that has been previously generated, the video augmenter can allow the digital advertisement management system to verify or track each time an advertisement is used. Accordingly, the digital advertisement management system can more accurately track and report on advertisement usage, impressions, conversion, etc.

As used herein, the terms "advertisement" and "ad" refer to a digital visual media (an image, a video, an animation, etc.) that includes information about a brand or product/service. For example, an advertisement can include a digital video/image promoting a product or service related to an advertising entity. The digital advertisement management system can manage advertisements from a plurality of advertisers and select advertisements to insert into video content.

As used herein, the term "video content" refers to digital video that a viewer can view on a client device. For example, video content can include digital video that a viewer downloads, streams, or otherwise accesses on a client device. To illustrate, video content can include, but is not limited to, video clips, television shows, movies, 360 degree videos, virtual reality environments, video gaming environments, etc.

As used herein, the terms "media insertion location" and "location" refer to a visual position within video content on which the video augmenter places an advertisement. For example, a media insertion location can include a surface of a digital object within video content.

As used herein, a "digital object" refers to a visual object that is part of the video content. Specifically, a digital object is an object captured by a camera device or created by a computing device and is visible within one or more video frames of video content. To illustrate, an object can include a billboard, a storefront, a vehicle, or any other visual item that includes a surface where the video augmenter may place an advertisement.

As used herein, the term "advertiser system" refers to an entity that provides advertisements for display with media content. For example, an advertiser system can include an individual advertiser that creates and/or provides advertisements for display within video content on user client device(s). Alternatively, an advertiser system can include a group of advertisers that create and/or provide advertisements for display within media content on user client device(s).

As used herein, the term "content provider system" refers to a system that provides media content for display at user client device(s). Specifically, a content provider system can include a system that generates video content or other media content to provide one or more users. The content provider system can be associated with a media streaming service or other media viewing service that allows users to access video content to view on their own devices. Alternatively, a content provider system can be a media content aggregator that receives content generated by one or more other systems and then provides the aggregated media content to users.

As used herein, the term "digital advertisement management system" refers to a system that manages the augmentation of video content with advertisements to provide to user client devices. Specifically, a digital advertisement management system can communicate with content providers to access video content and identify one or more media insertion locations within the video content. A digital advertisement management system can also communicate with advertiser systems to access advertisements to select advertisements for augmenting the video content. A digital advertisement management system can also augment accessed video content with retrieved advertisements. Furthermore, a digital advertisement management system can include one or more computing devices to perform video content augmentation processes and for providing augmented video content to user client devices.

As used herein, the term "administrator device" refers to a device that allows an administrator user to provide advertisements within video content. Specifically, the administrator device can include a desktop device, a laptop device, a handheld device, or other computing device that allows an administrator to select, view, and/or modify media insertion locations within video content. Alternatively, the administrator device can include a computing device that allows an administrator to manage the insertion of advertisements into video content for automated media insertion location identification (e.g., access and manage analytics data or other data maintained by the digital advertisement management system).

As used herein, the term "client device" refers to a computing device that allows a user to view media content including advertisements. In particular, a client device includes a desktop device, a laptop device, a handheld device, or other computing device that allows a user to access video content from a content provider system. Additionally, a client device is capable of communicating with advertiser systems to augment video content with advertisements from one or more advertisers. For example, a client device can run one or more applications to allow a user to view augmented video content in one or more environments.

A media insertion location can also include dimension and location parameters that allow the video augmenter to accurately locate the media insertion location relative to other visual objects within video content. The dimension parameters can include shape and size information to define the boundaries of the media insertion location. Additionally, the location parameters can include a set of coordinates that describe the position of the media insertion location for each video frame of the video content.

As described briefly above, the video augmenter augments video content by inserting targeted advertising into identified locations within video content. FIG. 1 illustrates an example environment 100 in which a digital advertisement management system including a video augmenter determines locations for inserting advertisements into video content, selects advertisements, and then augments the video content with the advertisements. The environment 100 includes a viewer 102 operating a client device 104 (or "viewing device"), an administrator 106 operating an administrator device 108, one or more server(s) 110, an advertiser system 112, and a content provider system 114. The client device 104, the administrator device 108, the server(s) 110, the advertiser system 112, and the content provider system 114 can communicate with each other via a network 116.

Each of the client device 104, the administrator device 108, the server(s) 110, the advertiser system 112, and the content provider system 114 can include one or more software components. As illustrated, the server(s) 110 can include or implement a digital advertisement management system 122 including a video augmenter 124. The client device 104 includes a client application 118 that allows the viewer 102 to view and interact with video content and/or other media content on the client device 104. As illustrated, the client application 118 can run on the client device 104 to provide video content and advertisements to the viewer 102. The client application 118 can allow the viewer 102 to communicate with the content provider system 114 to retrieve video content. The client device 104 can download or stream video content provided by the content provider system 114. Additionally, the content provider system 114 and/or the client device 104 can communicate with the server(s) 110 in connection with the retrieval of the video content. As described in more detail below, video augmenter 124 implemented by the server(s) 110 perform operations associated with selecting and inserting advertisements into video content that the viewer 102 requests.

The administrator device 108 allows the administrator 106 to interact with video content from the content provider system 114 to select media insertion locations within the video content. The administrator 106 can be associated with the content provider system 114 or the advertiser system 112. The administrator 106 can use an administrator application 120 on the administrator device 108 to access video content to identify and select one or more media insertion locations. Additionally, the video augmenter 124 can automatically identify media insertion locations in video content using image processing techniques. The administrator device 108 can then communicate with the server(s) 110 to provide information about the media insertion locations.

In one or more embodiments, the server(s) 110 includes a digital advertisement management system 122 that identifies requests to retrieve video content from the content provider system 114. The digital advertisement management system 122 can communicate with the advertiser system 112 to obtain and store advertisements (or access locations of the advertisements) to insert into video content from the content provider system 114. In response to receiving an indication that the viewer is requesting video content from the content provider system 114, the video augmenter 124 accesses the video content to identify one or more media insertion locations within the video content for inserting advertisements.

The digital advertisement management system 122 can communicate with one or more components of the environment 100 to obtain information for selecting an advertisement. After identifying a media insertion location within the video content and selecting an advertisement, the video augmenter 124 augments the video content by inserting the advertisement into the video content. In particular, the video augmenter 124 digitally inserts the advertisement onto an object within the video content at the identified location. The video augmenter 124 uses coordinates of the location to "pin" the advertisement to the corresponding object in each frame of the video content. Thus, as the object moves within the video content, the advertisement follows the object to make the advertisement appear to be part of the original video content.

In one or more embodiments, the administrator application 120 includes an application that is implemented as a stand-alone application, such as a desktop or mobile application, or as one or more web-based applications hosted on a remote server. Furthermore, the administrator application 120 may be implemented in a suite of mobile device applications or "apps." The digital advertisement management system 122 can similarly include one or more applications associated with providing video content with targeted advertisements. To illustrate, the suite of applications can include one or more applications such as, but not limited to, applications in ADOBE® MARKETING CLOUD® and ADOBE® TARGET®. "ADOBE", "MARKETING CLOUD", and "TARGET" are registered trademarks of Adobe Systems Incorporated in the United States and/or other countries.

Although the environment 100 in FIG. 1 illustrates a specific configuration of hardware and software, the environment 100 can include other configurations of hardware and/or software. For example, the environment 100 may include any number of additional or alternative components (e.g., any number of client devices, servers, or third-party entities/components). To illustrate, the digital advertisement management system 122 may be implemented in a distributed server environment (e.g., in a cloud storage system) that allows an administrator to insert targeted advertisements into video content and provide the video content to viewers. In one or more alternative embodiments, the digital advertisement management system 122 runs on a single computing device such that the administrator client device 108 can perform all of the operations associated with inserting advertisements into previously generated video content, including generating and providing content to a viewer. Additionally, the digital advertisement management system 122 may be implemented as one or more operating systems, in one or more stand-alone applications, as one or more modules of an application, as one or more plug-ins, as one or more library functions or functions that may be called by other applications, and/or as a cloud-computing model.

Although FIG. 1 illustrates client device 104 in communication with the server(s) 110, the server(s) 110 may communicate with any number of client devices to provide video content augmented with targeted advertisements to a plurality of different viewers. Furthermore, although FIG. 1 illustrates a single administrator client device 108, advertiser system 112, and content provider system 114 in communication with the digital advertisement management system 122 via the network 116, the digital advertisement management system 122 can communicate with any number of advertisers, content providers, and administrators in connection with providing targeted advertisements in video content to viewers. Additionally, while FIG. 1 illustrates certain details associated with various devices and components associated with the digital advertisement management system 122 and the video augmenter 124, FIG. 7 and the accompanying description detail additional components and functionalities of the digital advertisement management system 122 and the video augmenter 124 in more detail.

According to one or more embodiments, the client device 104 includes a computing device that is capable of providing a video viewing environment (e.g., a video player, web browser, VR environment) in connection with the client application 118. For instance, the client device 104 can include a desktop computing device, laptop computing device, or handheld computing device (e.g., a mobile phone or tablet). Similarly, the administrator device 108 can include a desktop computing device, laptop computing device, or handheld computing device capable of providing an interface for selecting media insertion locations into video content in connection with the administrator application 120. The client device 104 and the administrator device 108 can comprise computing devices that include the additional components as described in more detail below with respect to FIG. 7. Additionally, inputs to the client device 104 and the administrator device 108 can include, but are not limited to, peripheral devices (e.g., a mouse or touchpad) or a touchscreen input.

Similarly, the server(s) 110 can include any type of computing device capable of implementing one or more components of the digital advertisement management system 122 and the video augmenter 124 of FIG. 1. For example, the server(s) 110 can implement the digital advertisement management system 122 in a cloud storage system or other distributed storage system that allows users to access video content with targeted advertisements from any device. The server(s) 110 can also include an advertisement repository and/or content repository to host advertisements and/or video content for providing to the client device 104. Alternatively, the digital advertisement management system 122 can access advertisement/content repositories at the advertiser system 112 and content provider system 114, respectively, each time a viewer requests to view video content.

Figure 2A:
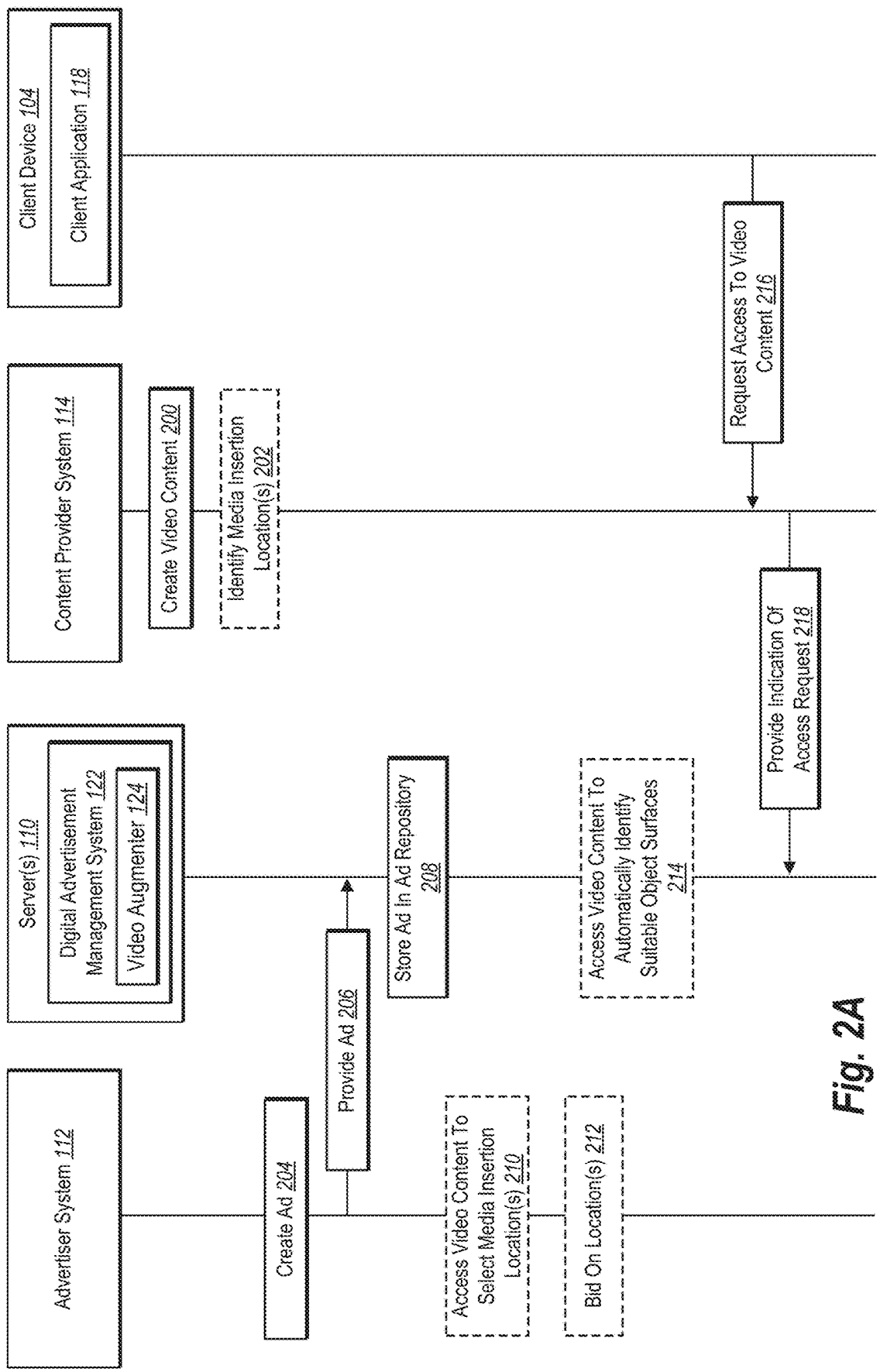
FIGS. 2A-2B illustrate a sequence-flow diagram illustrating interactions as part of a process for augmenting video content with digital visual media in accordance with one or more embodiments.
Figure 2B:
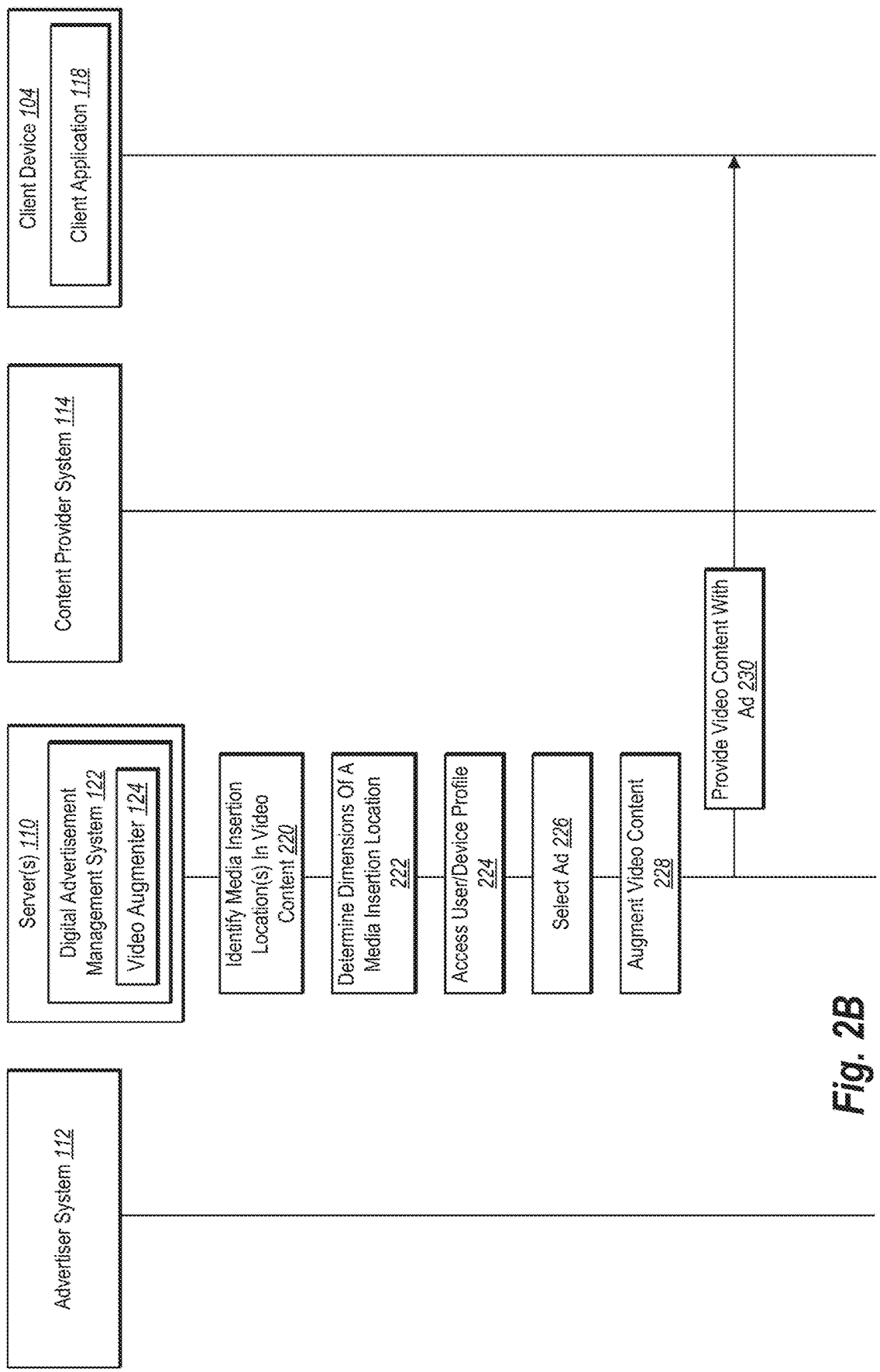

As described previously, the video augmenter 124 can analyze video content requested by a viewer to identify a media insertion location, select an advertisement, and digitally insert the advertisement into the video content at the media insertion location. In one or more embodiments, the insertion occurs prior to delivering previously generated video content to the viewer's device. In one or more alternative embodiments, the digital advertisement management system inserts the advertisements in real-time as the viewer streams video content on the viewer's device. FIGS. 2A-2B illustrate an advertisement insertion workflow involving augmenting video content with static and/or video advertisements. As described in more detail below, FIGS. 2A-2B and the accompanying description illustrate a process for identifying specific locations within video content for inserting advertisements in a way that is nonintrusive and seamless.

With reference now to FIG. 2A, a process diagram includes advertiser system 112, server(s) 110 with the digital advertisement management system 122 and the video augmenter 124, content provider system 114, and client device 104 with client application 118. Specifically, the client application 118 can provide an interface for a user to access and watch video content on the client device 104. For example, the user can access video content provided by the content provider system 114. As described below, the video augmenter 124 facilitates the insertion of advertisements from the advertiser system 112 into the requested video content by communicating with the advertiser system 112 and the content provider system 114.

In one or more embodiments, a process for a viewer to view video content augmented with targeted advertisements begins with the content provider system 114 creating or accessing video content 200. For example, the content provider system 114 can generate one or more types of video content to provide to a plurality of viewers. The video content can include, but is not limited to, short videos, television shows, movies, 360 degree videos, or virtual reality videos. In one or more alternative embodiments, the content provider system 114 provides video content from one or more third-party systems. The content provider system 114 can include a content repository that stores video content and allows viewers to access the video content on their respective devices.

As previously described, an administrator can be associated with the content provider system 114 or the advertiser system 112. Thus, the process can optionally include an administrator associated with the content provider system 114 identifying media insertion location(s) 202 within video content. For example, an administrator associated with the content provider system 114 can view the video content and use one or more tools in an administrator application to select portions of the video content to designate as media insertion locations. To illustrate, the tools can allow the administrator to highlight a region in a frame of the video content, such as by selecting a surface of an object within the video content. In one or more embodiments, the content provider system 114 provides information about the selected object surface for the video content to the digital advertisement management system 122.

In one or more embodiments, the content provider system 114 determines locations within the video content with the intent to sell advertising space to one or more advertisers. Thus, the content provider system 114 identifies the media insertion location(s), as described above, to set advertising coordinates. By selecting locations within the video content for selling to advertisers, the content provider system 114 can work with many different advertisers (e.g., via the digital advertisement management system 122) to sell the advertising space. In one example, the content provider can sell the advertising space per view so that the content provider system 114 is paid per view without knowing exactly which advertisements are inserted into the video content.

FIG. 2A also illustrates that the advertiser system 112 creates an ad 204 that promotes a brand, good, or service. Specifically, the ad can include a visual static advertisement or a video advertisement. The advertiser system 112 can create the ad at any time, either before or after the content provider system 114 creates the video content. After creating the ad, the advertiser system 112 can provide the ad 206 to the digital advertisement management system 122 so that the video augmenter 124 can insert the ad into one or more video content items. The digital advertisement management system 122 can store the ad in an ad repository 208 along with other ads from the advertiser system 112 or from one or more other advertisers.

In addition to the ads, the ad repository can store information about the ads. For instance, the ad repository can include information that allows the digital advertisement management system 122 to identify an audience for a given ad. To illustrate, the ad repository can include target age groups, genders, interests, locations, or other characteristics of a targeted audience. In one or more embodiments, the digital advertisement management system 122 determines target audience information by analyzing the contents of the ads. Alternatively, the digital advertisement management system 122 can determine target audience information based on input from the advertiser system 112.

As briefly mentioned previously, an administrator may be associated with the advertiser system 112. Optionally, the administrator associated with the advertiser system 112 can access video content to select media insertion location(s) 210. For instance, the advertiser system 112 (or a corresponding administrator) can access and view video content available from the content provider system 114 by communicating with the content provider system 114 via a network connection. For example, the advertiser system 112 can view a video content item to identify one or more surfaces of objects within the video content item and send the information about the selected object surfaces to the video augmenter 124.

Also, optionally, the advertiser system 112 can bid on location(s) 212 within video content. Specifically, the digital advertisement management system 122 can request bids from a plurality of advertisers to determine which of a plurality of different ads to display in a given media insertion location. The advertisers can submit bids (e.g., in an anonymous bidding system) for media insertion locations in a video content item. Thus, in one or more embodiments, the advertiser may never even see the ad location. In particular, an advertiser may bid on and purchase an ad space of certain dimensions and context so that the viewers match their target audience. Alternatively, the advertisers can submit bids for specific video content items. As described in more detail below, the digital advertisement management system 122 can select an ad to insert into a media insertion location based on the bids from advertisers in addition to the targeted audience characteristics.

In one or more embodiments, the video augmenter 124 also optionally accesses video content to automatically identify suitable object surfaces 214. For instance, the video augmenter 124 can use various image processing techniques to analyze the video content and identify objects within the video content. The video augmenter 124 can analyze the video content using object recognition processes to find objects within the video content that have dimensions suitable for inserting ads. To illustrate, the video augmenter 124 can find objects with flat or curved surfaces that fit the dimensions of advertisements in the ad repository.

According to one or more embodiments, the video augmenter 124 trains a machine-learning model to identify suitable locations and unsuitable locations within the video content for inserting advertisements. For example, the video augmenter 124 can train the machine-learning model to identify suitable locations based on areas that already include advertising or that are typically associated with advertising (e.g., billboards, video boards, truck trailers, buses, storefronts, taxis); flat, rectangular areas (e.g., walls, billboards, ground surfaces, televisions); areas that remain in a viewable area of the video content and are relatively motionless for a predetermined amount of time or that move slowly; and areas of the video content that are likely to attract the viewer's attention (e.g., large areas or areas that are close to the viewer/camera view). The video augmenter 124 can train the machine-learning model to identify unsuitable locations based on areas that are visually busy (e.g., areas that would make the advertisements difficult to discern such as street scenes) and areas that are inappropriate for advertisements (e.g., inside a home or church). The video augmenter 124 can further train the machine-learning model to identify ideal times within the video content for displaying advertisements that would not interfere with the viewer's enjoyment or understanding of the video content (e.g., by avoiding displaying advertisements that interfere with a mood or pivotal plot moment of the video content). Additionally, the video augmenter 124 can use manual validation of the results to further train the machine-learning model.

In at least some implementations, the video augmenter 124 finds unobscured, flat surfaces on objects such as billboards, signs, storefronts, and even vehicles. In alternative implementations, the video augmenter 124 also finds partially obscured and/or uneven surfaces that are suitable for the system to insert ads on top of the surfaces. The video augmenter 124 can also identify object surfaces based on existing ads from the original video content. For example, the video augmenter 124 can identify ad spaces on clothing (e.g., shirts, hats), cups/mugs, books/newspapers, picture frames, etc., and select one or more of such surfaces as media insertion locations.

After the advertiser system 112, content provider system 114, and/or the digital advertisement management system 122 have selected one or more media insertion locations in video content, the video augmenter 124 can begin augmenting the video content with advertisements in response to viewer requests to view video content. As illustrated in FIG. 2A, a viewer of the client device 104 requests access to video content 216 from the content provider system 114. For example, the viewer can use the client application 118 to browse content provided by the content provider system 114 and select one of the available video content items to view on the client device 104. Although FIG. 2A illustrates that the video augmenter 124 identifies media insertion locations prior to the client device 104 requesting the video content, the video augmenter 124 can analyze the video content for media insertion locations in real-time.

When the content provider system 114 receives the request to view video content, the content provider can provide an indication of the access request 218 to the digital advertisement management system 122. Specifically, the content provider system 114 can send information identifying the video content to the digital advertisement management system 122. In one or more embodiments, the information also includes information about one or more media locations in the video content (if the content provider system 114 did not previously provide such information to the digital advertisement management system 122). Alternatively, the digital advertisement management system 122 may already have the information or may receive such information from the advertiser system 112 in response to the indication of the access request.

The video augmenter 124 then identifies the media insertion location(s) in the video content 220, as illustrated in FIG. 2B. In particular, the video augmenter 124 determines the specific position of the media insertion location(s) based on coordinates obtained from the advertiser system 112, the content provider system 114, and/or from automatically identifying the media insertion location(s). For example, the video augmenter 124 can use the coordinates to determine the position of the corresponding object relative to other objects and/or a boundary of a field of view. To illustrate, for video content with a field of view that is fixed to a camera view of a single camera device used to capture the video content, the coordinates can be relative to a field of view boundary (e.g., the number of pixels from the edge of the field of view). Alternatively, for video content that does not have a fixed field of view, but allows viewers to modify the field of view (e.g., virtual reality or 360-degree video), the coordinates can be relative to a three-dimensional axis origin.

Because the content is video content including a plurality of frames, the coordinates for a given media insertion location can also change relative to objects within the video content or to a field of view. In one or more embodiments, the video augmenter 124 determines the coordinates of the media insertion location for each frame of the video content and stores the coordinates in an array, table, or other data structure. Accordingly, video augmenter 124 can store a plurality of changing coordinates for a media insertion location within an array to describe the path of the media insertion location in connection with the path of the corresponding object within the video content.

In one or more embodiments, the video augmenter 124 determines the dimensions of a media insertion location 222 from one or more media insertion locations in the video content. As mentioned, the video augmenter 124 can also determine information about media insertion locations when automatically identifying media insertion locations using image processing. The information can include various parameters of the media insertion locations that describe a shape of the location (e.g., triangle, rectangle, circle, other polygon) and a perspective of the location (e.g., whether the shape of the location is skewed). Accordingly, the video augmenter 124 can use the dimensions and other visual parameters of the media insertion location to select a subset of advertisements from the ad repository.

After identifying a subset of advertisements that fit the dimensions/shape of the location, the digital advertisement management system 122 can access a user/device profile 224 to select an ad to insert into the media insertion location. In particular, the digital advertisement management system 122 can use information about the viewer and/or the viewer's device to select an ad. The digital advertisement management system 122 can locate and access the user profile by using a viewer identifier or login information corresponding to the client application 118. The digital advertisement management system 122 accesses the user profile to determine interests, viewing history, location, or other information about the viewer to select an ad that may interest the viewer.

In at least some embodiments, the digital advertisement management system 122 does not have the identity of the viewer. In such cases, the digital advertisement management system 122 can obtain a device identifier from the request to access video content. The device identifier may be associated with a device profile that the digital advertisement management system 122 maintains to store a viewing history associated with the client device 104 of the viewer. The digital advertisement management system 122 can also determine additional information for the client device based on the viewing history, such as interests or location, to use in selecting an ad in which the viewer may be interested.

After determining the dimensions of the media insertion location and accessing a user/device profile, the digital advertisement management system 122 selects an ad 226 from the ad repository. Specifically, selecting an ad includes selecting an ad in which the viewer may be interested using the information that the digital advertisement management system 122 determines for the viewer from the user/device profile. Additionally, the selected ad includes dimensions that fit within the dimensions of the media insertion location. As described in more detail below, the digital advertisement management system 122 can also modify the ad to fit to the dimensions of the media insertion location.

After selecting the ad, the video augmenter 124 augments the video content 228 with the advertisement. For example, the video augmenter 124 first determines whether the ad is a static ad or a video ad. To insert a static ad into the media insertion location, the video augmenter 124 can generate a texture layer that includes the ad and fits the texture layer to the dimensions of the media insertion layer. The video augmenter 124 can also fit to the perspective of the media insertion based on the corresponding digital object. For example, if the object appears to be facing a direction that is not directly at the viewer, the video augmenter 124 can change the perspective of the texture layer so that the angle, size, and shape of the ad appears to fit to the object surface within the video content.

Alternatively, if the selected ad is a video ad, the video augmenter 124 can insert a video player into the video content at the media insertion location. For instance, the video augmenter 124 can insert a hypertext markup language ("HTML") player into the media insertion location that fits to the dimensions of the location. Additionally, the video augmenter 124 can link the video player to a location of the video ad so that the video player plays the video ad as the video content plays on the client device 104. By inserting the video player and linking the video player to the selected video ad, the video augmenter 124 can easily change the video ad playing in the video player for another viewer (or for a subsequent viewing by the same viewer) by changing the location linked to the video player.

Furthermore, by using a video player, the video augmenter 124 can insert the video ad as an interactive experience for the viewer. In one or more embodiments, an interactive video player within the video content can allow the viewer to pause the ad, fast forward or rewind the ad, follow a link in the ad to a website of the advertiser system 112, etc. Accordingly, while the viewer watches the video content and an ad is present within a field of view of the viewer, the viewer can interact with the ad in a natural way as if the ad were being displayed in a standalone video player.

In one or more embodiments, the video augmenter 124 positions the ad within each frame of the video content to fit to the media insertion location based on the stored coordinates for the media insertion location (e.g., within an array containing the coordinates). Specifically, the video augmenter 124 uses the coordinates for a given frame to insert the ad at the coordinates. For example, the coordinates can allow the video augmenter 124 to digitally place the ad on the surface of the object corresponding to the coordinates. If the coordinates of the surface of the object change from one frame to another (e.g., the object moves or the field of view shifts so that the surface changes shape), the coordinates will indicate the change, and the video augmenter 124 places the ad according to the changed coordinates in the subsequent frame.

In one or more embodiments, the video augmenter 124 modifies an ad to make the ad fit to the dimensions of the media insertion location. For instance, the dimensions of the ad may fit the object surface in one frame, but may not fit the object surface in a subsequent frame. In such cases, the video augmenter 124 can make the ad fit the dimensions of any frame by cropping, stretching, zooming, cutting apportion of the ad, or otherwise modifying the ad to fit to the media insertion location. Thus, the video augmenter 124 can adjust the ad to appear as if the ad were actually on the object surface even if part of the object surface becomes obscured by another object within the video content.

After augmenting the video content with the ad, the digital advertisement management system provides the video content with the ad 230 to the client device 104. The video content provided to the client device 104 includes one or more ads digitally inserted into one or more media insertion locations in the video content. Accordingly, the video content includes targeted advertisements for the viewer associated with the client device 104. In one or more embodiments, the digital advertisement management system 122 provides the video content directly to the client device 104. In one or more alternative embodiments, the digital advertisement management system 122 provides the video content by communicating with the content provider system 114 to provide the video content to the client device 104.

While the previous description relates to inserting a single ad into a single media insertion point, the video augmenter 124 can insert any number of ads into any number of media insertion locations of video content. For example, the video augmenter 124 can insert a single ad a plurality of times into a video content item (e.g., a single ad on a plurality of billboards or other object surfaces in a video). Additionally, the video augmenter 124 can insert different ads each time the same viewer views the content item.

Figure 3A:
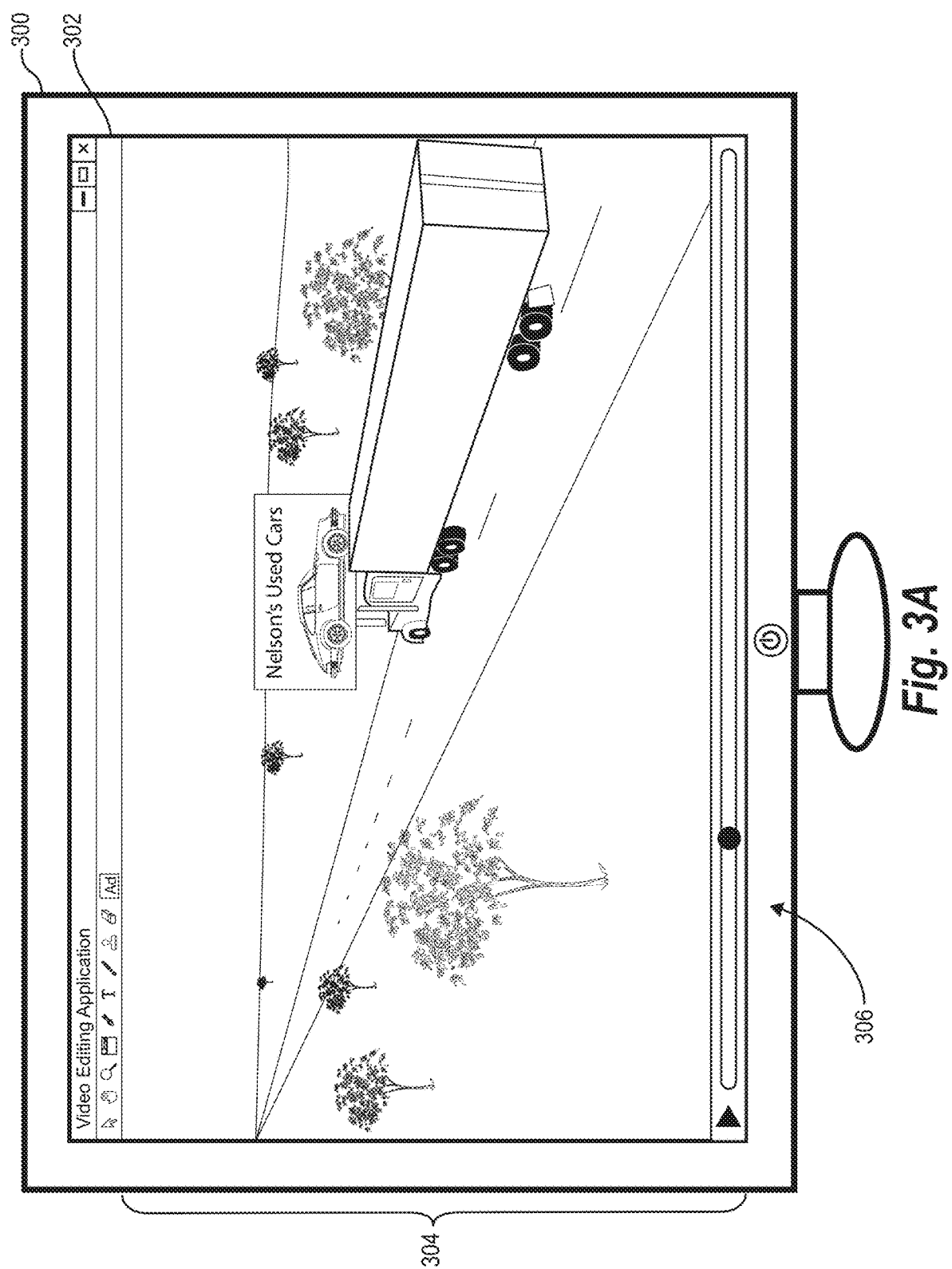
FIGS. 3A-3D illustrate example user interfaces for inserting digital visual media into locations within video content in accordance with one or more embodiments.

As described above, the video augmenter 124 can augment video content by inserting an advertisement at a media insertion location selected by an administrator or automatically by the video augmenter 124. FIGS. 3A-3D illustrate user interfaces for selecting media insertion locations in video content and managing available advertisements for inserting into the video content. Specifically, FIG. 3A illustrates a client device 300 including a video editing application 302 that allows an administrator to view and interact with video content to select media insertion locations.

As illustrated, the video editing application 302 provides a video editing interface 304 that displays video content with which the administrator can interact, as described herein. In particular, the administrator can view a video content item (e.g., a video file). As previously mentioned, the video content can include conventional digital video within a video player, 360 degree videos, virtual reality, etc. For example, the video content can include a plurality of different objects, at least one of which includes a surface suitable for inserting advertisements. FIG. 3A illustrates that the video content includes a tractor trailer and a billboard among additional scenery (e.g., trees, road).

Additionally, the video editing application 302 can include a timeline 306 that allows the administrator to advance the video content in either direction. In particular, the timeline 306 can allow the administrator to scrub forward or backward in the video content to view different frames of the video content. The timeline 306 can also include a playback feature to allow the administrator to play the video content from the beginning or from a selected time in the timeline 306. The administrator can use the playback feature to find object surfaces suitable for media insertion locations.

Figure 3B:
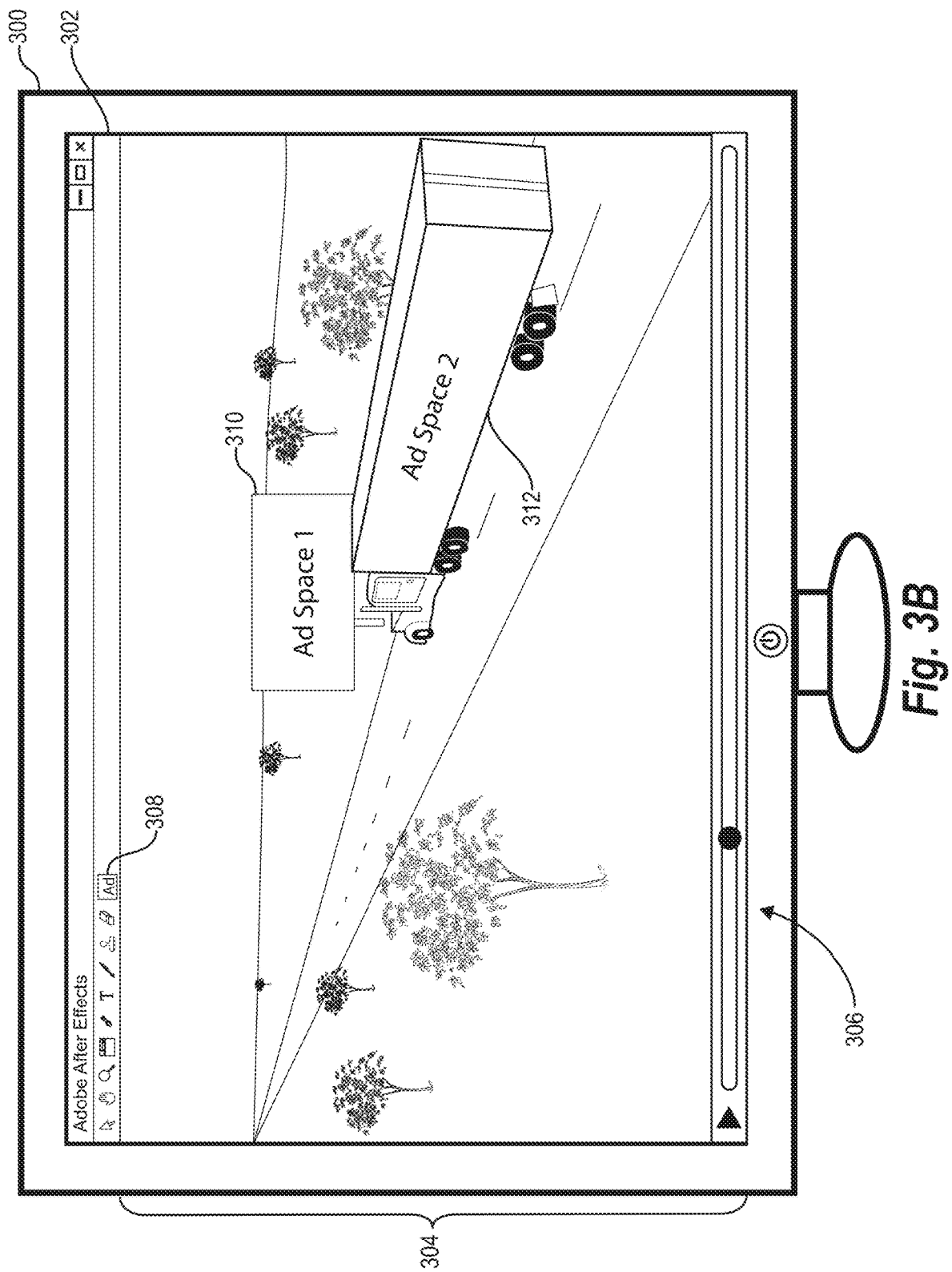

In one or more embodiments, the video editing application 302 includes tools for editing the video content in a variety of ways. For example, the video editing application 302 can include a tool for adding/selecting media insertion locations to the video content. FIG. 3B illustrates the video editing application 302 on the client device 300 in which the video augmenter 124 has identified a plurality of media insertion locations within the video content. The video editing application 302 can include a location selection tool 308 in the video editing interface 304 that allows the administrator to manually select one or more of the media insertion locations.

As can be seen, the video augmenter 124 has identified a plurality of surfaces that are suitable locations for inserting advertisements. The administrator can use the location selection tool 308 to select one or more of plurality of media insertion locations based on the shape, size, accessibility/visibility, or other characteristics. To illustrate, FIG. 3B illustrates that the administrator has selected a first media insertion location 310 ("Ad Space 1") and a second media insertion location 312 ("Ad Space 2") within the video content for inserting advertisements. In addition to selecting the media insertion locations, the administrator can input one or more characteristics of the media insertion locations such as an advertisement type (e.g., static, video) for each location.

To select the media insertion locations, the administrator can select from any frame within the video content. Accordingly, the administrator can go forward and backward in time in the video content to select one or more media insertion locations identified by the video augmenter 124. In one or more embodiments, the first media insertion location 310 and the second media insertion location 312 mentioned above occur in the same frame of the video content. Alternatively, the administrator can determine that the first media insertion location 310 and the second media insertion location 312 occur in at least one different frame of the video content (e.g., the first media insertion location 310 is visible while the second media insertion location 312 is not visible, or vice versa).

When the administrator selects the media insertion locations in the video content, the video editing application 302 can display an indicator of the selected media insertion locations within the video editing interface 304. For example, the video editing application 302 can display the selected media insertion locations as overlays on top of the video content. The overlays can include information associated with the media insertion locations including, but not limited to, dimensions (e.g., height/width), shape, type of advertisement to be inserted. Additionally, the administrator can modify the shapes, sizes, and/or positions of the media insertion locations by interacting with the overlays. Accordingly, if the administrator wishes to remove a media insertion location, the administrator can move or delete the corresponding media insertion location.

After selecting the media insertion locations, the video augmenter 124 can process the video content to track the motion of the corresponding object surfaces. Specifically, the video augmenter 124 can use motion tracking processes to determine a path of each object surface and then assign the motion tracking information to the corresponding media insertion locations. By assigning the motion tracking information to the media insertion locations, the video augmenter 124 determines an array of coordinates for each of the media insertion locations across the plurality of frames of the video content.

In one or more embodiments, the video augmenter 124 determines the coordinates for each media insertion location according to a coordinate system for the video content. As briefly mentioned above, the video augmenter 124 can use different coordinate systems depending on the type of video. If the coordinate system is based on a fixed origin (e.g., for 360-degree video or virtual reality), the coordinates correspond to the distance from the fixed origin in a three-dimensional space. Alternatively, if the coordinate system is based on the field of view of the viewer (e.g., relative to a boundary of a video player), the coordinates for each media insertion location correspond to the fixed origin in a two-dimensional space. The video augmenter 124 can also store the coordinates for each media insertion location as metadata in the video content.

Figure 3C:
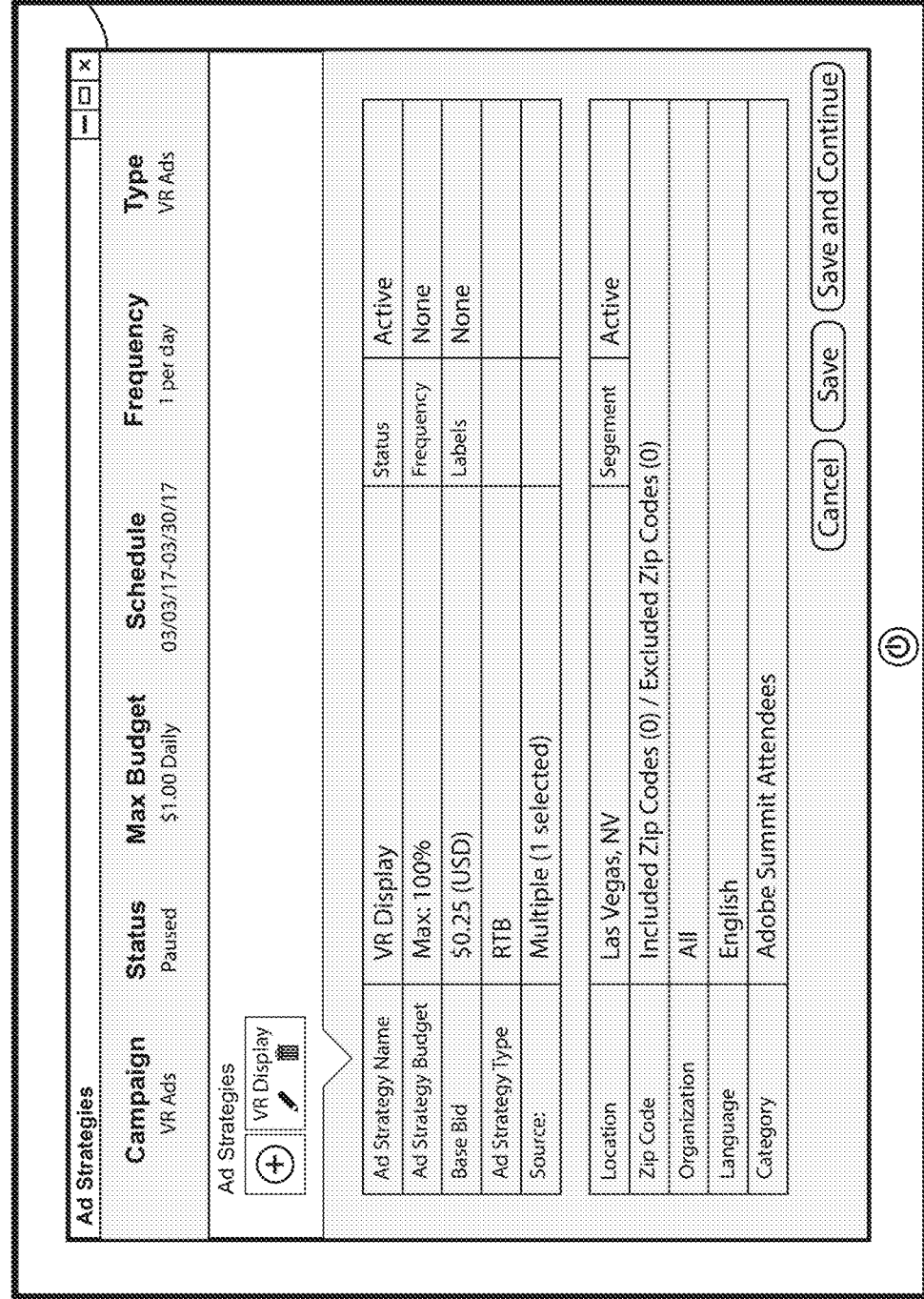
Figure 3D:
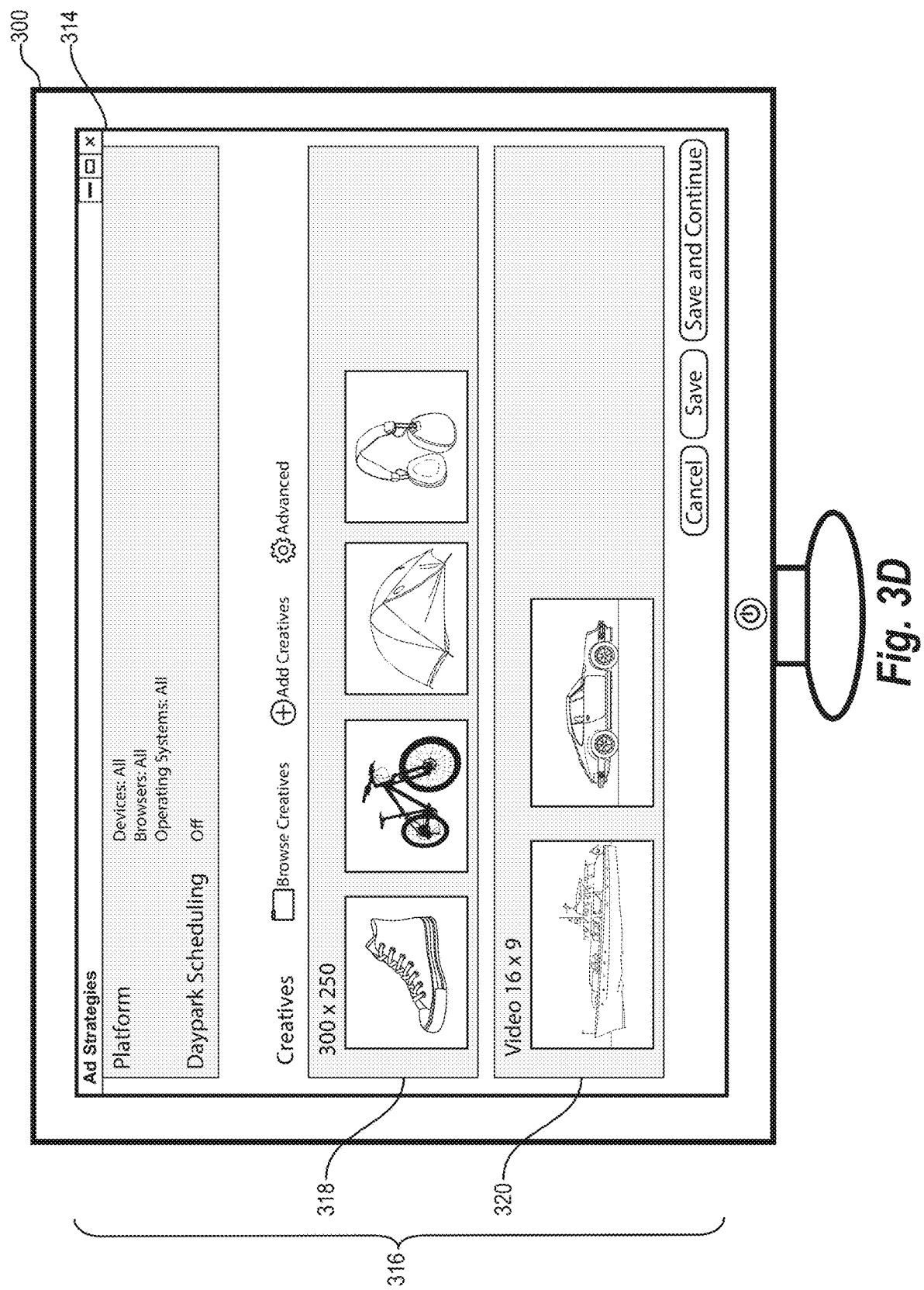

In addition to selecting one or more media insertion locations, an administrator associated with an advertiser can manage additional information associated with inserting advertisements into video content. For example, FIGS. 3C-3D illustrate user interfaces for an advertisement management application 314 that allows the administrator to manage advertisements for inserting into video content. The advertisement management application 314 can include an ad management interface 316 that allows the administrator to create and manage ad campaigns involving a plurality of advertisements for inserting into various video content items.

As illustrated in FIG. 3C, the ad management interface 316 allows an administrator to create ad campaigns with various advertising strategies. For example, the administrator can assign a plurality of parameters for an ad campaign including, but not limited to, campaign name, status, budget, schedule, frequency, ad types, bids, sources, location information, language, category, and intended audience. The parameters determine how the digital advertisement management system selects advertisements to insert into video content. For instance, the administrator can pause an ad campaign so that the digital advertisement management system does not select advertisements from the ad campaign while paused. Additionally, the digital advertisement management system can select advertisements from the ad campaign until the ad campaign reaches the established budget, the set scheduler, or the frequency. Furthermore, the digital advertisement management system selects advertisements to insert media insertion locations that match the ad type selected for the ad campaign and/or each individual advertisement in the ad campaign.

Once the administrator has set the parameters for an ad campaign, the administrator can save the parameters and then determine which advertisements to include in the ad campaign, as described in more detail with reference to FIG. 3D. As shown in FIG. 3D, the administrator can view advertisements included in an ad campaign. The ad management interface 316 can display a plurality of assets (i.e., photos or other visual images) available for use in advertisements with the ad campaign. For instance, the ad management interface 316 can display a first section 318 including static advertisements (e.g., still-frame images) and a second section 320 including video advertisements. Although FIG. 3D illustrates only two sections, the ad management interface 316 can organize assets into a plurality of different categories based on size, type, content, or other characteristics of the assets.

The administrator (or another user) can add, remove, or modify assets associated with the ad campaign within the ad management interface 316. Additionally, the administrator can view additional detail associated with an asset by selecting the asset within the ad management interface 316. For example, the administrator can view the asset type, dimensions, performance (e.g., in one or more ad campaigns), and other metrics or characteristics associated with the asset by selecting the asset. The ad management interface 316 can display the overlay in a detail overlay or in another interface.

After the administrator establishes the parameters for an ad campaign and adds advertisements to the ad campaign, the digital advertisement management system can select advertisements from the ad campaign to insert into video content. In one or more embodiments, the digital advertisement management system selects advertisements based on the parameters from the ad campaign. For example, the digital advertisement management system can select an advertisement based on a bid from the advertiser and the dimensions of the advertisement. In at least one implementation, the digital advertisement management system selects an advertisement from an ad campaign that targets the viewer (e.g., based on identified characteristics of the viewer). The selection can be random from a plurality of advertisements that fit the required characteristics or according to an established priority. The digital advertisement management system can further select based on a previous selection history from the ad campaign or based on a performance of assets in the ad campaign, such that lesser used and/or better performing assets are preferred.

Figure 4A:
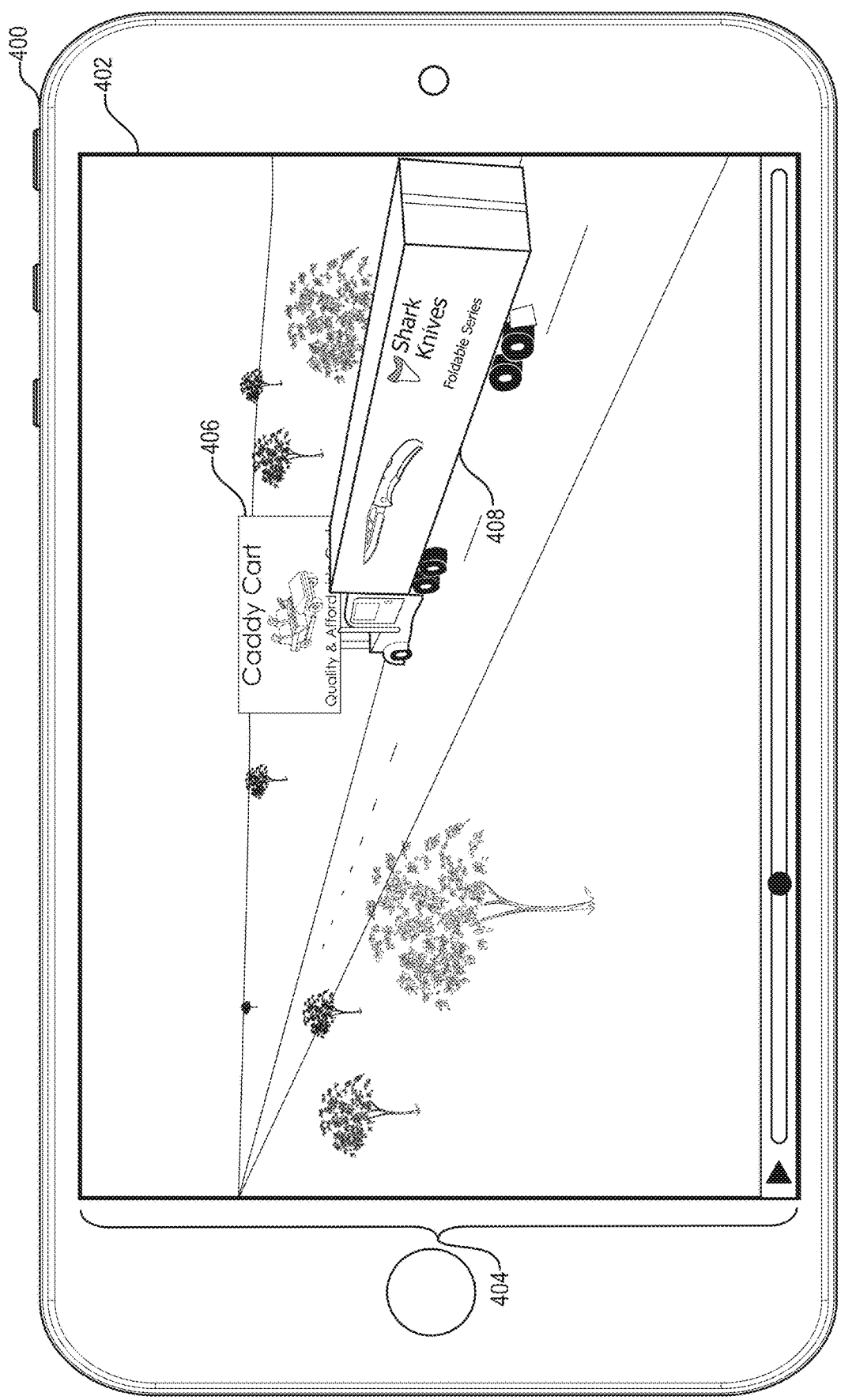
FIGS. 4A-4C illustrate example user interfaces for presenting video content augmented with digital visual media in accordance with one or more embodiments.
Figure 4B:
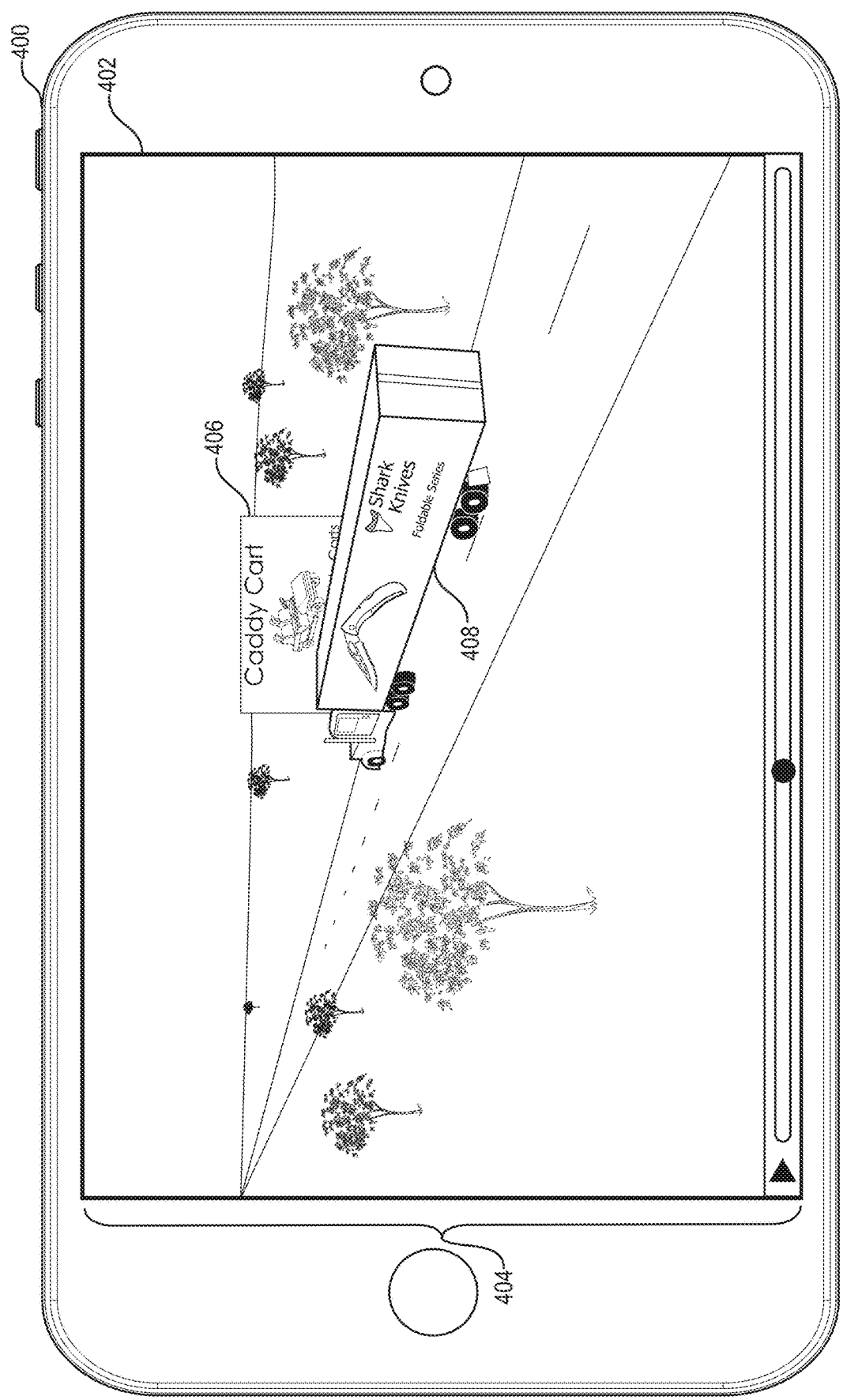
Figure 4C:
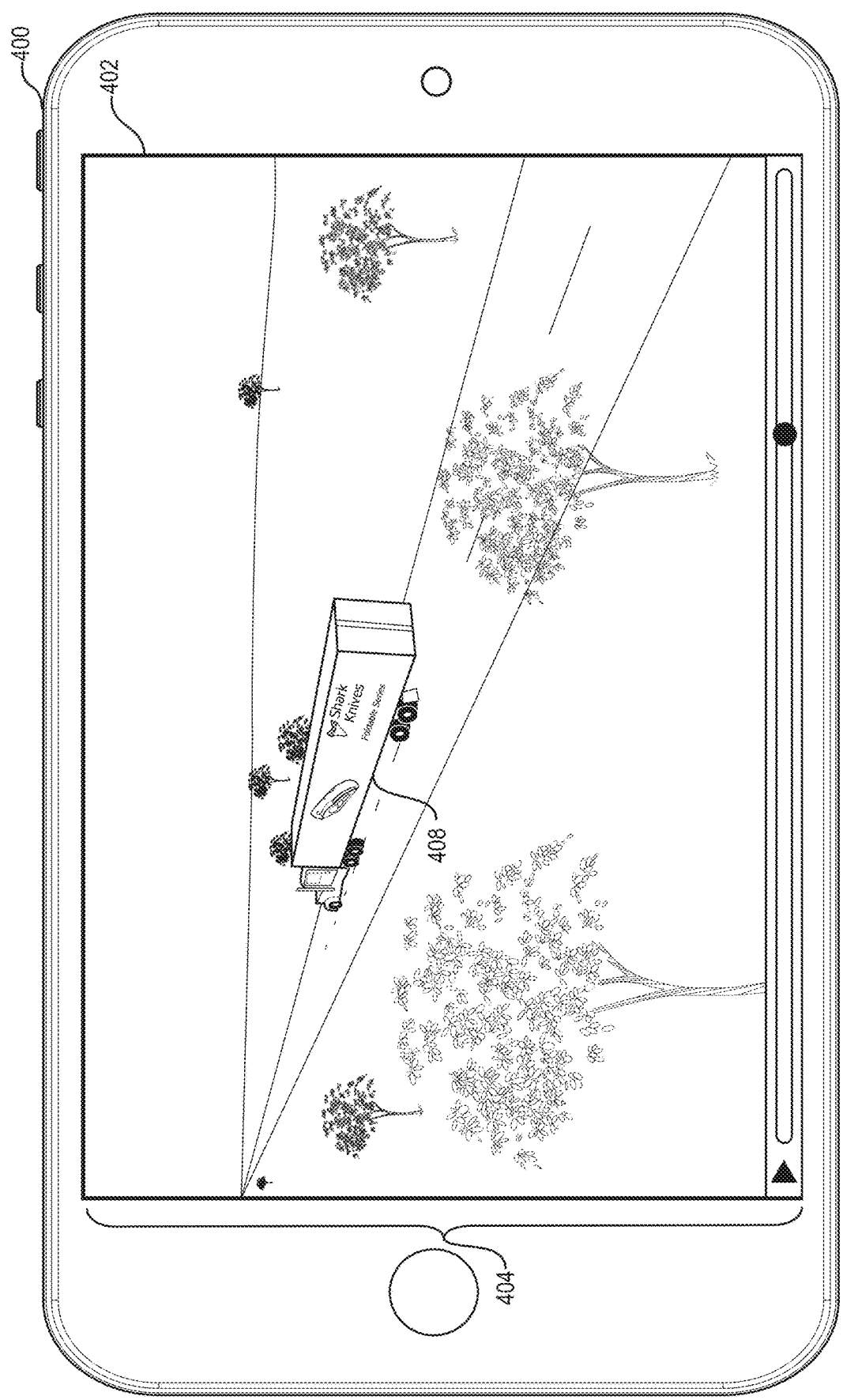

Once the digital advertisement management system has selected an advertisement for a media insertion location in video content, the video augmenter 124 augments the video content with the advertisement using the stored information for the media insertion location. FIGS. 4A-4C illustrate a viewing device 400 that includes a client application 402 for displaying video content that a viewer has requested from a content provider. Specifically, FIG. 4A illustrates a video interface 404 of the client application 402 that allows the viewer to watch video content that the viewing device downloads or streams from a content provider.

In one or more embodiments, the video augmenter 124 has inserted a first advertisement 406 into the first media insertion location (i.e., first media insertion location 310 of FIG. 3B) and a second advertisement 408 into the second media insertion location (i.e., second media insertion location 312 of FIG. 3B). For example, the digital advertisement management system selects a static advertisement to insert into the first media insertion location and a video advertisement to insert into the second media insertion location. The digital advertisement management system selects an advertisement that fits the dimensions and ad type of the first media insert location. The digital advertisement management system also selects an advertisement that fits the dimensions and ad type of the second media insert location.

Additionally, as previously mentioned, the digital advertisement management system selects advertisements to insert into the media insertion locations based on information about the viewer and/or the viewing device 400. For instance, if the viewer has a user profile associated with the client application 402 or the content provider, the digital advertisement management system can access the information from the user profile to identify interests or demographic information about the viewer. Alternatively, the digital advertisement management system can access a device identifier of the viewing device 400 and determine a viewing history associated with the viewing device 400. Accordingly, the digital advertisement management system selects advertisements that are targeted to the viewer.

Once the digital advertisement management system has selected the advertisements, the video augmenter 124 inserts the advertisements into the media insertion locations using the coordinates corresponding to the media insertion locations. To illustrate, the video augmenter 124 inserts the first advertisement 406 into the first media insertion location by pinning the first advertisement 406 to the coordinates stored as metadata with the video content. For example, the video augmenter 124 can assign the corners of the first advertisement 406 to the corners of the rectangular billboard of the first media insertion location, as illustrated in FIG. 3D.

For example, the video augmenter 124 can place the first advertisement into each frame at the coordinates corresponding to that frame. Thus, if the coordinates for the media insertion location change from one frame to another (e.g., based on the corresponding object surface changing position, shape, or perspective within the designated coordinate system), the advertisement inserted into the media insertion location changes with the changing coordinates. The video augmenter 124 similarly inserts the second advertisement 408 into the second media insertion location.

FIGS. 4B-4C illustrate the video content in the video interface 404 as the viewer watches the video content on the viewing device 400. In particular, FIG. 4B illustrates a frame of the video content that is chronologically after a frame shown in FIG. 4A. Similarly, FIG. 4C illustrates a frame of the video content that is chronologically after the frame illustrated in FIG. 4B. Accordingly, FIGS. 4A-4C illustrate the video content as it advances during playback on the viewing device 400.

As shown in FIG. 4B, the position and the content of the first advertisement 406 does not change as the video content plays to this point. Specifically, the coordinates of the media insertion location do not change during the time between the frame in FIG. 4A and the frame in FIG. 4B, so the position of the first advertisement 406 does not change. Additionally, because the first advertisement 406 is a static advertisement, the content of the first advertisement 406 remains the same regardless of whether the corresponding object moves during playback of the video content.

FIG. 4C illustrates that the second advertisement 408, which includes a video advertisement, plays during playback of the video content. As the video content plays, the video advertisement also plays according to the time that passes within the video content. For example, if the video augmenter 124 places the video advertisement on the side of a tractor trailer, as illustrated, the video advertisement plays on the side of the tractor trailer as if the side of the tractor trailer were a video screen. Additionally, the video advertisement may begin playing when the video advertisement becomes visible to the viewer within the video interface 404. Alternatively, the video advertisement may begin playing when the video content begins playing and play continuously on a loop as long as the video content is playing.

As shown, when the video content reaches a specific frame, the first advertisement 406 is no longer in the field of view because the field of view has changed (e.g., the camera panned away or otherwise moved). As a result, the object associated with the media insertion location of the first advertisement 406 moves out of view. Using the coordinates corresponding to the media insertion location, the digital advertisement management system causes the first advertisement 406 to move out of view with the object. Thus, the video augmenter 124 tracks the motion of the objects (via the media insertion locations) with which the advertisements correspond and causes the advertisements to follow the tracked motion of the objects.

As also illustrated, the tractor trailer on which the video augmenter 124 placed the video advertisement has continued to move. Accordingly, the video advertisement moves along with the tractor trailer so that the video advertisement remains on the side surface of the tractor trailer. The video augmenter 124 previously determined the coordinates of the corners of the tractor trailer by analyzing the video content and associated the determined coordinates with the video advertisement (e.g., with the video player linking to the video advertisement). As the tractor trailer moves relative to the field of view, the video advertisement advances in time, as shown by the knife in the video advertisement being open in FIG. 4A, partially open in FIG. 4B, and closed in FIG. 4C.

In one or more embodiments, inserting a video player at the coordinates of the media insertion location allows the video augmenter 124 to dynamically insert video advertisements into different instances of the video content for different viewers. For example, the digital advertisement management system associates a video advertisement with the video player by obtaining a link (e.g., a URL) of the video advertisement and inserting the link into the metadata of the video player. When a first viewer requests the video content, the digital advertisement management system can select a first video advertisement targeted to the first viewer and link the first video to the video player and then provide the video content to the first viewer's device. When a second viewer requests the same video content, the digital advertisement management system can select a second video advertisement targeted to the second viewer and link the second video to the video player and then provide the video content to the second viewer's device. Accordingly, inserting the video player allows the digital advertisement management system to provide different instances of the same video content with different advertisements without re-processing the video content.

In one or more additional embodiments, the digital advertisement management system selects a plurality of advertisements for a single media insertion location. For example, the digital advertisement management system can select a first video advertisement and a second video advertisement targeted to a viewer for displaying at different times within the same media insertion location. For instance, the digital advertisement management system can insert the first advertisement for a first timeframe of the video content and the second advertisement for a second timeframe of the video content. Thus, as the viewer watches the video content, the viewer may see different advertisements at different times on the same object surface.

Figure 5:
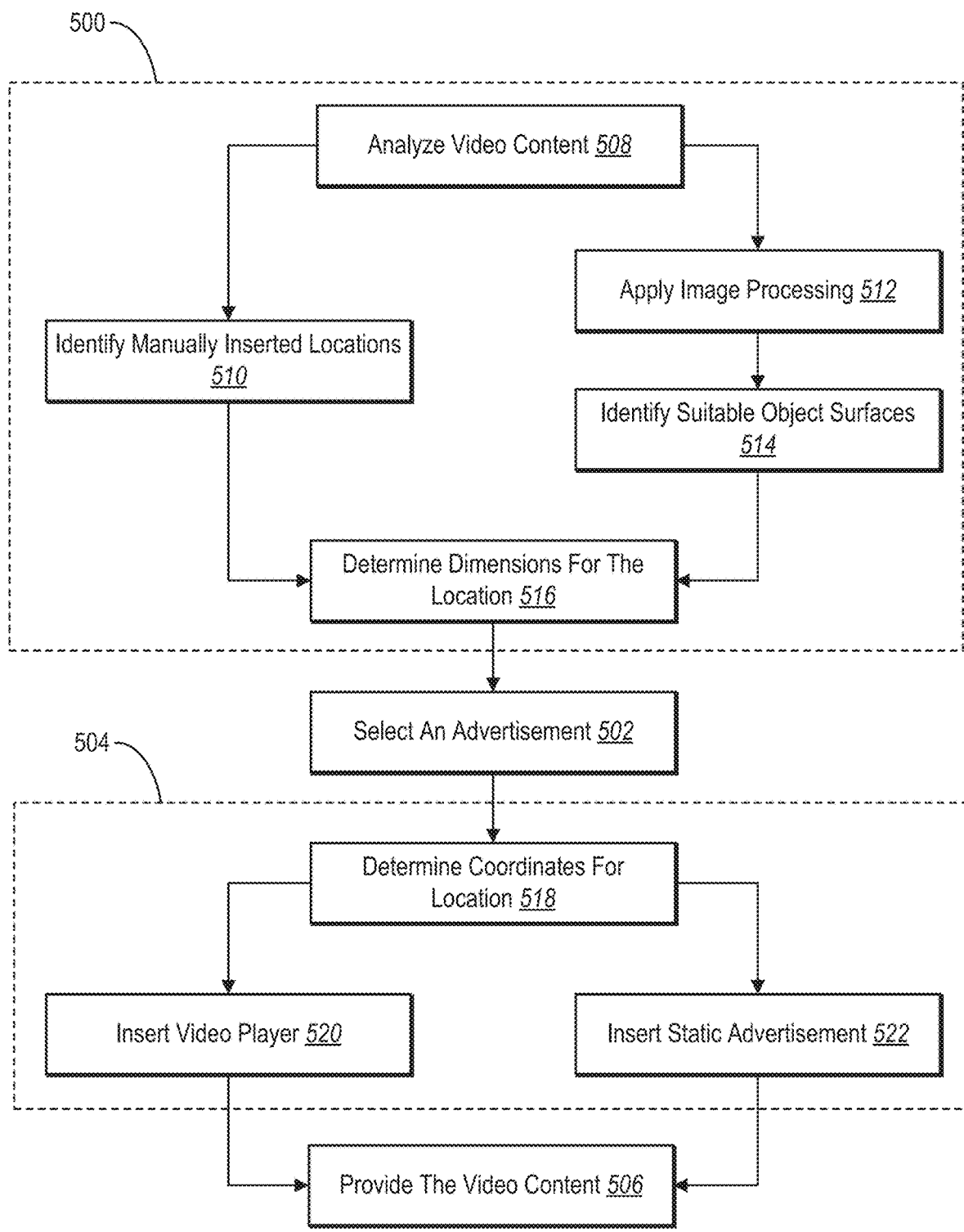
FIG. 5 illustrates a flowchart of an example algorithm of augmenting video content with digital visual media in accordance with one or more embodiments.

As described above, the video augmenter 124 can select and insert advertisements into video content. FIG. 5 illustrates a state chart of an algorithm for finding media insertion locations in video content and then inserting targeted advertisements into the media insertion locations. The process of FIG. 5 includes a step 500 for determining a media insertion location on a digital object within video content. After determining the media insertion location, the video augmenter 124 selects an advertisement 502 for a viewer requesting the video content. Additionally, the process includes a step 504 for augmenting the video content with the selected advertisement. The digital advertisement management system then provides the video content 506 to the viewing device of the viewer.

In one or more embodiments, the step 500 for determining a media insertion location on a digital object within video content includes identifying one or more media insertion locations within video content. Specifically, the video augmenter 124 analyzes the video content 508 to identify media insertion locations that correspond to object surfaces suitable for inserting an advertisement into the video content. According to various implementations, the video augmenter 124 can identify media insertion locations based on user input or automatically identified media insertion locations.

For example, the video augmenter 124 can identify manually inserted locations 510 that an administrator associated with a content provider or advertiser marked in the video content. The manually inserted locations can include a set of points that the administrator inserted into one or more frames of the video content that mark the boundaries of the media insertion location. Additionally, the manually inserted locations can include additional parameters for the video augmenter 124 to use in selecting and inserting advertisements, such as an ad type.

Alternatively, the video augmenter 124 can apply image processing 512 to the video content to identify media insertion locations. For example, the video augmenter 124 can analyze individual frames of the video content using object recognition and/or machine-learning to identify and distinguish separate objects within the video content. Additionally, the video augmenter 124 can identify positions of the objects based on a coordinate system that the video augmenter 124 establishes for the video content. As described previously, the coordinates can be based on a three-dimensional or a two-dimensional origin according to a three-dimensional space in a virtual reality environment or 360-degree environment, or a two-dimensional boundary of a video player.

In addition to identifying the location of objects based on the coordinate system, the video augmenter 124 can identify suitable object surfaces 514 of the identified objects. For instance, the video augmenter 124 can identify visible object surfaces that would allow a user to clearly see an advertisement. The video augmenter 124 can also identify object surfaces that may catch the eye of a viewer based on the positioning, prominence, movement, size, or other characteristics. As mentioned previously, the video augmenter 124 can also identify object surfaces that already have ads as suitable surfaces such as shirts, mugs, etc. Additionally, the video augmenter 124 can identify object surfaces with common shapes that correspond to advertisements in an ad repository.

After identifying suitable object surfaces, the video augmenter 124 can determine dimensions for the location 516. Specifically, the video augmenter 124 determines the shape and the size of the media insertion location so that a selected advertisement will fit on the corresponding object surface. For example, the video augmenter 124 can determine a pixel size of the object surface. Alternatively, the video augmenter 124 can use another measurement method for determining a size of the media insertion location.

After the video augmenter 124 has identified locations and determined the dimensions of the locations, the video augmenter 124 selects an advertisement 502 that fits the dimensions of a media insertion location. For instance, the video augmenter 124 can access an ad repository and find a plurality of advertisements that have a size, aspect ratio, shape, etc., that fits the media insertion location. The video augmenter 124 then uses information about the viewer and/or the viewer device to select an advertisement in which the viewer may be interested, as described previously.

The video augmenter 124 then proceeds with the step 504 for augmenting the video content with the selected advertisement. The video augmenter 124 can first determine coordinates for the location 518. For example, the video augmenter 124 can determine the coordinates from metadata of the video content. To illustrate, the coordinates can be stored in an array of tuples that define the coordinates of the media insertion location.

Each tuple in the array can include a number of values representing the boundaries of the media insertion location corresponding to a specific frame of the video content. For instance, a tuple can include coordinates (e.g., "x,y,z" coordinate values) representing the four corners of a rectangle, three coordinates representing corners of a triangle, or another number corresponding to boundaries of a different shape. A tuple may also include additional information such as Bezier curve definitions to represent a non-linear boundary (e.g., a curved edge) of a media insertion location. Thus, the tuple can define the shape and position of the media insertion location in a given frame of the video content. The array of tuples defines the shape and location of the media insertion for all of the frames in which the media insertion location is visible within the video content.

According to one or more embodiments, when inserting a video advertisement into the media insertion location, the video augmenter 124 can insert a video player 520, as described previously with respect to FIGS. 2A-2B. For instance, the video augmenter 124 can embed the video player directly into the video content using the coordinates in the array of tuples. Thus, the video augmenter 124 can insert a video player within another video player so that the internal video player can move around (according to the coordinates) on a frame-by-frame basis to maintain the video player in the correct location on the object surface. Additionally, inserting an internal video player into another video player allows a viewer to interact with the video advertisement using the internal video player. Once the video augmenter 124 inserts the video player for the video advertisement into the video player of the video content, the video augmenter 124 can associate the video advertisement with the video player, as described above with respect to FIGS. 4A-4C.

In one or more embodiments, the video augmenter 124 inserts a static advertisement 522 into the media insertion location by placing the static advertisement directly into each frame of the video content. For example, for a static advertisement such as an image or text, the video augmenter 124 accesses the array of tuples containing the coordinates for each frame of the video content. The video augmenter 124 can then insert the image or text by overlaying the image or text onto the video content as layers at the corresponding coordinates for each frame. Alternatively, the video augmenter 124 can insert an image container (similar to a video player) and link the static advertisement to the image container so that the video augmenter 124 can easily swap out the linked advertisement. In one or more embodiments, the video augmenter 124 then performs additional processing on the video content to remove the layers and flatten each frame into a single layer. Alternatively, the video augmenter 124 retains the layers in the video content for providing to the viewer.

In one or more embodiments, inserting a video or static advertisement into a media insertion location involves changing the perspective of the advertisement. For instance, if the perspective of the object surface is skewed, the video augmenter 124 can skew the advertisement according to the perspective of the object surface. Similarly, the video augmenter 124 can insert an advertisement to an object surface by wrapping the advertisement to the object surface. For instance, the video augmenter 124 can place the advertisement on the object surface as a digital texture, or similar to placing a texture on an object, with a rotation value or a positional value relative to other objects in the video content (e.g., in front of or behind other objects). Thus, if the object rotates or otherwise causes part of the corresponding surface to become obscured, the advertisement follows the movement/rotation of the object so that the advertisement appears to also rotate or become obscured. This can allow the advertisement to appear as if the advertisement is part of the original video content.

Additionally, the video augmenter 124 can add additional coordinate points if the object surface becomes obscured by adding corner points to crop out part of the advertisement. To illustrate, if a rectangular advertisement becomes partially obscured by another object within the video content (e.g., by another rectangular object), the video augmenter 124 can detect that the visible portion of the object surface is a six-sided polygon. For the tuples corresponding to the frames in which the advertisement is partially obscured, the video augmenter 124 can store six coordinate points. The video augmenter 124 can also use the knowledge that the advertisement is originally rectangular to crop the obscured portion of the advertisement from the frames in which the object surface is partially obscured.

After the video augmenter 124 has augmented the video content with an advertisement, the digital advertisement management system provides the video content 506 to the viewer device. Specifically, the digital advertisement management system can communicate with the content provider to provide the video content to the viewing device with the inserted advertisements or provide the video content directly to the viewing device via a network connection. The viewer can then watch the video content and, in some instances, interact with the advertisements within the video content.

Figure 6:
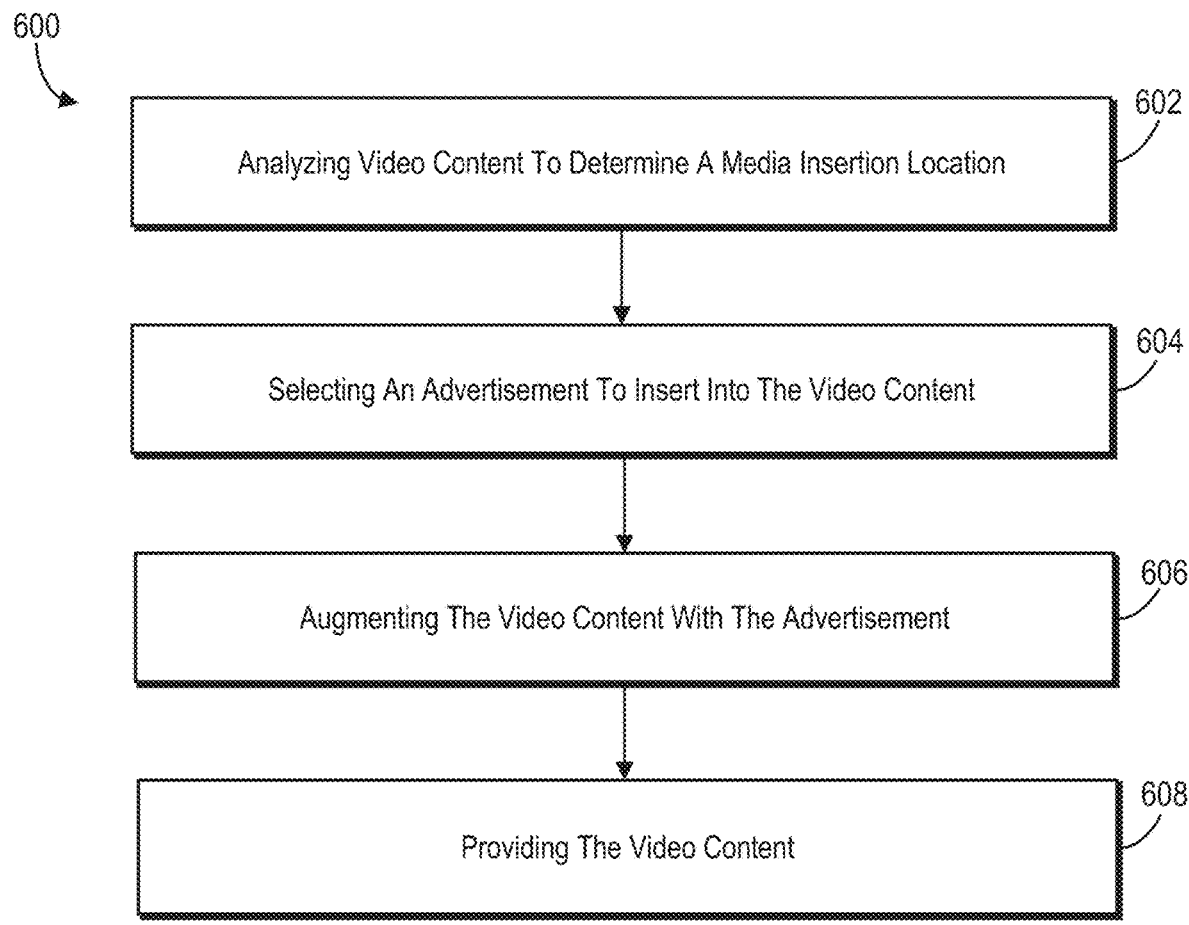
FIG. 6 illustrates a flowchart of a series of acts of augmenting video content by inserting advertisements into the video content in accordance with one or more embodiments.

FIGS. 1-5, the corresponding text, and the examples, provide a number of different systems and devices for augmenting video content with advertisements. In addition to the foregoing, embodiments can be described in terms of flowcharts comprising acts and steps for accomplishing a particular result. For example, FIG. 6, this figure illustrates a flowchart of a series of acts 600 of augmenting video content with a digital advertisement in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

The acts 600 include an act 602 of analyzing video content to determine a media insertion location. For example, act 602 involves analyzing video content to determine a media insertion location on a digital object within the video content, the media insertion location being suitable for placing an advertisement on the digital object within the video content. The digital object can include a stationary object or a moving object within the video content.

Act 602 can involve detecting, using image processing, a surface of the digital object within the video content, the surface comprising dimensions suitable for inserting the advertisement. Act 602 can also involve detecting the media insertion location on the digital object within the video content, the media insertion location comprising dimensions suitable for inserting the advertisement. Alternatively, act 602 can involve receiving an input from an administrator user indicating a selection of the media insertion location corresponding to the surface of the digital object.

The acts 600 also include an act 604 of selecting an advertisement to insert into the video content. For example, act 604 involves selecting an advertisement to digitally insert into the video content based on one or more of the media insertion location, a viewer of the video content, or a viewing device of the viewer. The advertisement can include static content or video content.

Act 604 can involve determining a device type of the viewing device, a location of the viewing device, or a viewing history associated with the viewing device. Act 604 can further involve selecting the advertisement based on the device type of the viewing device, the location of the viewing device, or the viewing history associated with the viewing device.

Act 604 can involve determining a device identifier of the viewing device, and accessing a viewing history associated with the viewing device based on the device identifier. Additionally, act 604 can then involve selecting the advertisement based on the viewing history associated with the viewing device.

Act 604 can involve accessing a user account of a user of the client device to determine one or more characteristics of the user, and selecting the advertisement based on the one or more characteristics of the user. Furthermore, act 604 can involve determining size dimensions of the media insertion location, and selecting the advertisement by identifying an advertisement that fits within the size dimensions of the media insertion location. For instance, act 604 can involve identifying, in an advertisement repository, a plurality of advertisements comprising dimensions corresponding to the dimensions of the visible object surface, and selecting, from the plurality of advertisements, the advertisement based on the viewer of the video content or the viewing devices of the viewer.

The acts 600 also include an act 606 of augmenting the video content with the advertisement. For example, act 606 involves augmenting the video content by placing the advertisement on the digital object within the video content at the media insertion location. Act 606 can involve placing the advertisement on a visible object surface within the video content at the media insertion location in response to a request to provide the video content to the client device.

Act 606 can involve determining coordinates for the media insertion location within the video content, and inserting the advertisement into the video content using the determined coordinates. For example, act 606 can involve determining two-dimensional coordinates for the media insertion location relative to an origin point at a border of a video player containing the video content. Alternatively, act 606 can involve determining three-dimensional coordinates for the media insertion location relative to an origin point corresponding to a perspective of the viewer.

As part of act 606, or as an additional act, the acts 600 can include inserting a hypertext markup language video player on the visible object surface within the video content at the media insertion location. The acts 600 can further include associating the hypertext markup language video player with a uniform resource locator link to the advertisement by inserting the uniform resource locator into metadata of the hypertext markup language video player, the advertisement comprising a video advertisement.

Additionally, the acts 600 can include an act 608 of providing the video content. For example, act 608 involves providing the video content comprising the advertisement for display at a client device. Act 608 can involve providing the video content with metadata comprising information about the advertisement to the client device.

Figure 7:
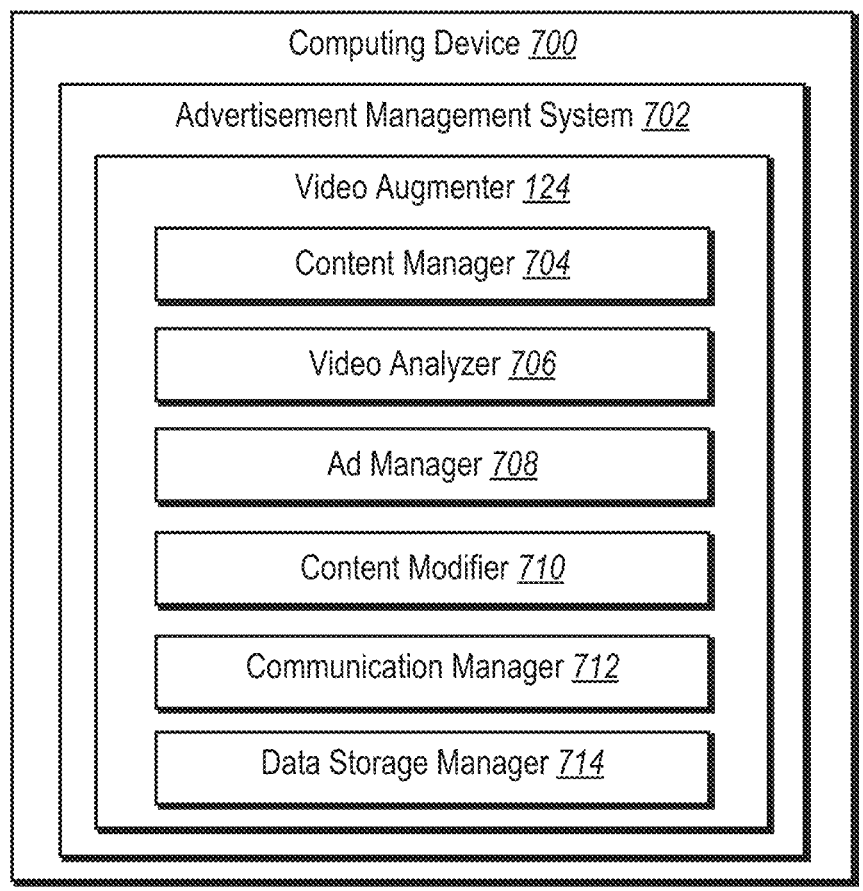
FIG. 7 illustrates a schematic diagram of a digital advertisement management system with a video augmenter in accordance with one or more embodiments.

FIG. 7 illustrates a schematic diagram illustrating a computing device 700 that includes or implements a digital advertisement management system 702. As illustrated by FIG. 7, the computing device 700 includes a plurality of components that perform at least some of the functions and methods described herein. The computing device 700 can include a personal computer, laptop computer, mobile device, mobile phone, tablet, special purpose computer, television, server device(s) or other computing device, including computing devices described below with regard to FIG. 8. Additionally, although FIG. 7 illustrates that the digital advertisement management system 702 is operating on a single computing device 700, the digital advertisement management system 702 may operate within a distributed environment, such that the digital advertisement management system 702 can be stored and/or operate on a plurality of computing devices. Furthermore, one or more client devices may remotely access the digital advertisement management system 702 to perform the document review processes described herein.

In one or more embodiments, the digital advertisement management system 702 is associated with one or more applications that run on the computing device 700. In particular, the digital advertisement management system 702 includes a video augmenter 124 including a content manager 704, a video analyzer 706, an ad manager 708, a content modifier 710, a communication manager 712, and a data storage manager 714. Although the components of the video augmenter 124 are shown to be separate in FIG. 7, any of the components may be combined into fewer components, such as into a single component, or divided into more components as may serve a particular implementation. Furthermore, at least some of the components of the digital advertisement management system 702 may be implemented on other devices and/or with other systems.

The components of the digital advertisement management systems 702 can include software, hardware, or both. For example, the components of the digital advertisement management system 702 (e.g., the components of the computing device 700) can include on or more instructions stored on a computer-readable storage medium and executed by processors of one or more computing devices such as the computing device 700. When executed by the one or more processors, the computer-executable instructions of the digital advertisement management system 702 cause the computing devices to perform the advertisement insertion processes described herein. Alternatively, the components of the digital advertisement management system 702 comprise hardware, such as a special purpose processing device to perform specific functions associated with document review processes. Additionally, the components of the digital advertisement management system 702 can comprise a combination of computer-executable instructions and hardware.

Furthermore, the components of the digital advertisement management system 702 performing the functions described herein with respect to the digital advertisement management system 702 may, for example, be implemented as part of a stand-alone application, as a module of an application, as part of a suite of applications, as a plug-in for applications including content creation applications, as a library function or functions that may be called by other applications, and/or as a cloud-computing model. Thus, the components of the digital advertisement management system 702 may be implemented as part of a stand-alone application on a personal computing device or a mobile device. Alternatively, or additionally, the components of the digital advertisement management system 702 may be implemented in any application that allows delivery of content to users (e.g., document sharing), as previously described.

As previously described, the digital advertisement management system 702 includes a content manager 704. Specifically, the content manager 704 facilitates management of video content. For example, the content manager 704 can allow the digital advertisement management system 702 to access video content available from one or more content providers. Alternatively, the content manager 704 can allow the digital advertisement management system 702 to store video content on the data storage manager 714. The content manager 704 can also communicate with the communication manager 712 to send and receiving information about requested video content in connection with one or more viewer devices.

The video analyzer 706 analyzes video content requested by a viewer to identify media insertion locations for inserting advertisements. In particular, the video analyzer 706 can analyze metadata associated with video content to identify media insertion locations, including dimensions and coordinates of the media insertion locations. For example, the video analyzer 706 can identify surfaces of digital objects that are suitable for inserting advertisements. Additionally, the video analyzer 706 can use image processing and machine-learning to find object surfaces that are suitable for inserting advertisements.

The digital advertisement management system 702 also includes an ad manager 708 that manages advertisements from one or more advertisers. For instance, the ad manager 708 can access a plurality of advertisements associated with a plurality of advertisers (e.g., in an ad repository) to select an advertisement to insert into a media insertion location associated with a digital object of requested video content. The ad manager 708 can use information from user profiles, device profiles, and video content to determine which advertisements to insert into media insertion locations in video content.

The content modifier 710 facilitates the insertion of advertisements into video content. Specifically, the content modifier 710 can insert advertisements into media insertion locations of video content using coordinate information associated with the media insertion locations. For example, the content modifier 710 can place a video player at a media insertion location for inserting a video advertisement. In another example, the content modifier 710 can place a static advertisement at a media insertion location.

The communication manager 712 facilitates communications between the digital advertisement management system 702 and one or more other components, such as the components of the environment of FIG. 1. For example, the communication manager 712 can facilitate communication between the digital advertisement management system 702 and content provider(s), advertiser(s), administrator device(s), and viewing device(s). Accordingly, the communication manager 712 can access video content and advertisements. Additionally, the communication manager 712 can receive information about media insertion locations from administrators and provide modified video content (i.e., video content with targeted advertisements) to viewers.

The digital advertisement management system 702 also includes a data storage manager 714 to store and maintain data on the computing device 700. In particular, the data storage manager 714 can communicate with the other components of the digital advertisement management system 702 to store data associated with the processes for inserting targeted advertisements into video content described herein. The data storage manager 714 can also provide the data to one or more of the components in connection with the advertisement insertion processes. For example, the data storage manager 714 can store information including, but not limited to, video content, advertisements (e.g., in an ad repository), user/device profiles, and/or media insertion location information.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
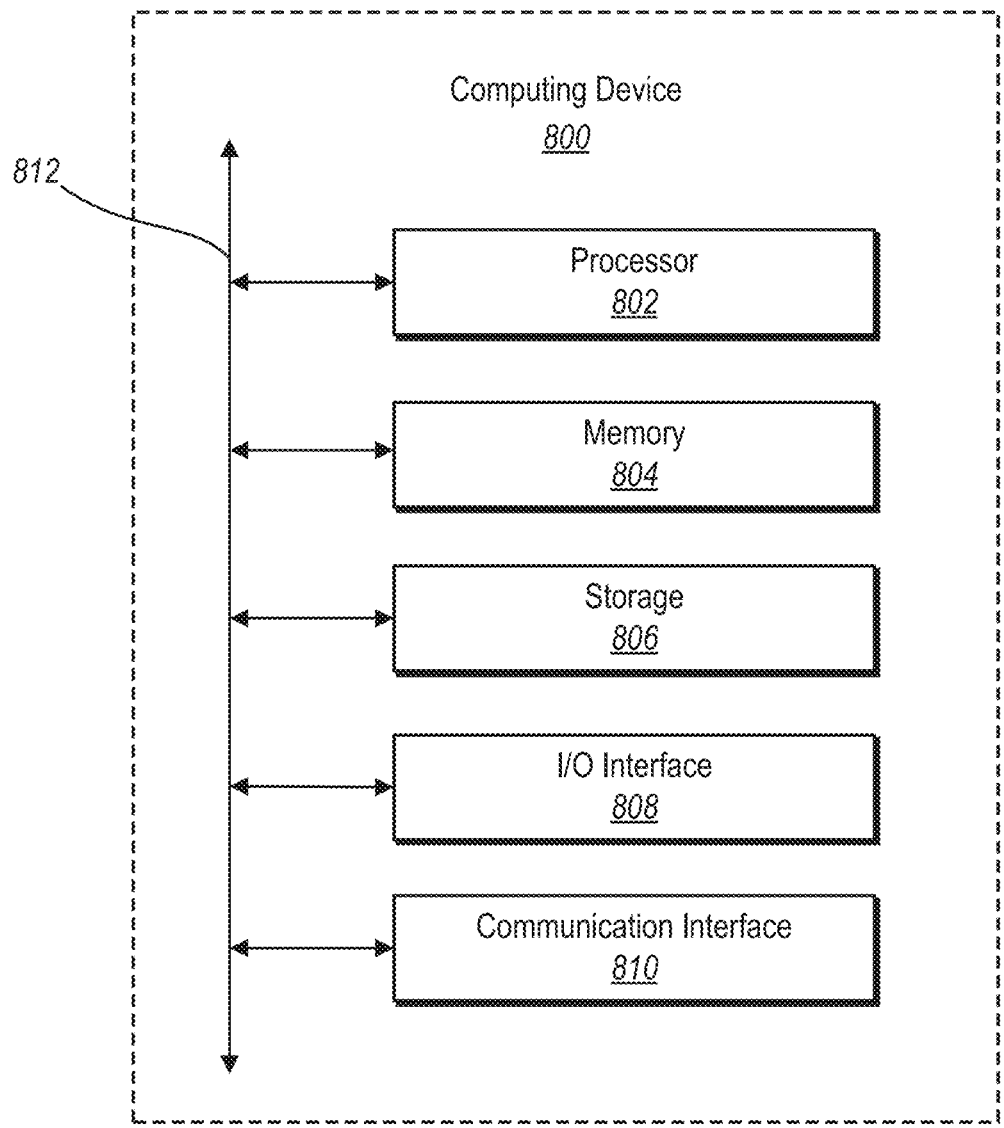
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the digital advertisement management system 702. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the document review process can allow a plurality of devices (e.g., a client device and server devices) to exchange information using various communication networks and protocols for sharing information such as electronic documents, annotations, and other document review information.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

I claim:

1. In a digital media environment for playing digital video, a computer-implemented method comprising:
analyzing 360-degree video selected to play on a viewing device to determine a media insertion location on a digital object within the 360-degree video;
generating a plurality of tuples comprising coordinates relative to a three-dimensional axis origin for the media insertion location in a plurality of video frames of the 360-degree video;
selecting a digital visual video to digitally insert into the 360-degree video based on one or more of the media insertion location, a viewer of the 360-degree video, or the viewing device;
digitally augmenting the 360-degree video with the digital video by inserting the digital video within a video player on the digital object in the plurality of video frames within the 360-degree video at the coordinates of the plurality of tuples;
providing the 360-degree video comprising the digital video for display at the viewing device;
detecting that the digital object moves from a first position to a second position relative to other objects within the 360-degree video to enter a field of view of the viewing device; and
configuring the video player to start playing the digital video upon the media insertion location on the digital object entering the field of view of the viewing device as the digital object moves from the first position to the second position within the 360-degree video.

2. The computer-implemented method as recited in claim 1, wherein generating the plurality of tuples comprises generating, for each video frame of the plurality of video frames of the 360-degree video, an array of tuples defining a shape and a location of the media insertion location.

3. The computer-implemented method as recited in claim 2, wherein generating the array of tuples defining the shape and the location of the media insertion location comprises generating a Bezier curve definition to represent a non-linear boundary of the media insertion location.

4. The computer-implemented method as recited in claim 1, wherein digitally augmenting the 360-degree video with the digital video comprises inserting, for at least one of the video frames, the digital video outside of the field of view of a current field of view of the viewing device.

5. The computer-implemented method as recited in claim 1, wherein digitally augmenting the 360-degree video with the digital video comprises inserting a hypertext markup language video player at the media insertion location.

6. The computer-implemented method as recited in claim 1, wherein digitally augmenting the 360-degree video with the digital video comprises inserting the digital video as a layer pinned to the digital object at the coordinates of the media insertion location.

7. The computer-implemented method as recited in claim 1, wherein the 360-degree video comprises a virtual reality video.

8. A non-transitory computer readable storage medium comprising instructions that, when executed by at least one processor, cause a computing device to:
analyzing 360-degree video selected to play on a viewing device to determine a media insertion location on a digital object within the 360-degree video;
determining a distance of the media insertion location from a fixed three-dimensional axis origin of the 360-degree video;
generating a plurality of tuples comprising coordinates encoding the distance of the media insertion location to the fixed three-dimensional axis origin;
selecting a digital video to digitally insert into the 360-degree video based on one or more of the media insertion location, a viewer of the 360-degree video, or the viewing device;
digitally augmenting the 360-degree video with the digital video by inserting the digital video within a video player on the digital object in the 360-degree video at the coordinates of the plurality of tuples;
providing the 360-degree video comprising the digital video for display at the viewing device;
detecting that the digital object moves from a first position to a second position relative to other objects within the 360-degree video to enter a field of view of the viewing device; and
configuring the video player to start playing the digital video upon the media insertion location on the digital object entering the field of view of the viewing device as the digital object moves from the first position to the second position within the 360-degree video.

9. The non-transitory computer readable storage medium as recited in claim 8, further comprising instructions that, when executed by the at least one processor, cause the computing device to determine the media insertion location by automatically detecting, using image processing, a surface of the digital object within the 360-degree video, using a machine learning model trained to recognize one or more of areas that include: advertising; flat rectangular areas, areas that remain relatively still for a predetermined time period; areas that are typically associated with advertising; or areas that are busy.

10. The non-transitory computer readable storage medium as recited in claim 8, further comprising instructions that, when executed by the at least one processor, cause the computing device to digitally augment the 360-degree video with the digital video by inserting a hypertext markup language video player onto the digital object at the coordinates of the plurality of tuples.

11. The non-transitory computer readable storage medium as recited in claim 8, further comprising instructions that, when executed by the at least one processor, cause the computing device to insert, for at least one of video frame, the digital video outside of the field of view of a current field of view of the viewing device.

12. The non-transitory computer readable storage medium as recited in claim 8, further comprising instructions that, when executed by the at least one processor, cause the computing device to:

determine, using a machine-learning model, a time during the 360-degree video to avoid inserting the digital video into the 360-degree video based on a mood of the 360-degree video; and digitally augment, in response to determining the time to avoid inserting the digital video, the 360-degree video with the digital video at the media insertion location during a time other than the determined time.

13. In a digital media environment for playing digital video, a system for inserting digital visual media into digital video, comprising:

a non-transitory computer memory comprising:
  a repository including digital visual media content items; and
at least one server device configured to cause the system to:
  analyze 360-degree video to determine a media insertion location on a visible object surface of a digital object within the 360-degree video, the visible object surface being visible within a plurality of video frames of the 360-degree video;
  generate a plurality of tuples comprising coordinates relative to a three-dimensional axis origin for the media insertion location for video frames of the plurality of video frames of the 360-degree video including the media insertion location;
  select a digital video from the repository to digitally insert into the 360-degree video based on one or more of a viewer of the 360-degree video or a viewing device;
  digitally augment the 360-degree video with the digital video by inserting the digital video within a video player into the video frames of the 360-degree video including the media insertion location at the coordinates of the plurality of tuples;
  provide the 360-degree video comprising the digital video for display at the viewing device;
  detect that the digital object moves from a first position to a second position relative to other objects within the 360-degree video to enter a field of view of the viewing device; and
  configure the video player to start playing the digital video upon the media insertion location on the digital object entering the field of view of the viewing device as the digital object moves from the first position to the second position within the 360-degree video.

14. The system as recited in claim 13, wherein the at least one server is configured to cause the system to digitally augment the 360-degree video with the digital video by inserting a hypertext markup language video player on the visible object surface at the coordinates of the plurality of tuples.

15. The system as recited in claim 14, wherein the at least one server is further configured to cause the system to associate the hypertext markup language video player with a uniform resource locator link to the digital video by inserting the uniform resource locator link into metadata of the hypertext markup language video player.

16. The system as recited in claim 15, wherein the at least one server is further configured to cause the system to select the digital video by embedding script into the hypertext markup language video player that causes a webpage associated with the digital video to open upon interaction with the digital video.

17. The system as recited in claim 13, wherein the at least one server is configured to cause the system to select the digital video by:

determining a device identifier of the viewing device;
accessing a viewing history associated with the viewing device based on the device identifier; and
selecting the digital video based on the viewing history associated with the viewing device.

18. The system as recited in claim 13, wherein the at least one server is configured to cause the system to select the digital video by:

accessing a user account of the viewer of the viewing device to determine characteristics or interests of the viewer; and
selecting the digital video based on the characteristics or interests of the viewer.

19. The system as recited in claim 13, wherein the at least one server is configured to cause the system to generate the plurality of tuples by generating, for each video frame of the plurality of video frames of the 360-degree video, an array of tuples defining a shape and a location of the media insertion location.

20. The system as recited in claim 13, wherein the at least one server is configured to cause the system to digitally augment the 360-degree video with the digital video by inserting the digital video outside of a current field of view of the viewing device for at least one of the video frames.

* * * * *